US011694726B2

(12) United States Patent
Liu et al.

(10) Patent No.: US 11,694,726 B2
(45) Date of Patent: *Jul. 4, 2023

(54) AUTOMATIC TRAILER DETECTION IN MULTIMEDIA CONTENT

(71) Applicant: Netflix, Inc., Los Gatos, CA (US)

(72) Inventors: Dong Liu, San Jose, CA (US); Lezi Wang, Piscataway, NJ (US); Rohit Puri, Saratoga, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,536

(22) Filed: Apr. 20, 2022

(65) Prior Publication Data

US 2022/0248096 A1 Aug. 4, 2022

Related U.S. Application Data

(63) Continuation of application No. 17/095,486, filed on Nov. 11, 2020, now Pat. No. 11,350,169.
(Continued)

(51) Int. Cl.
*H04N 21/466* (2011.01)
*G11B 27/28* (2006.01)
(Continued)

(52) U.S. Cl.
CPC ............ *G11B 27/28* (2013.01); *G06N 20/00* (2019.01); *G06V 10/454* (2022.01); *G06V 10/82* (2022.01);
(Continued)

(58) Field of Classification Search
None
See application file for complete search history.

(56) References Cited

U.S. PATENT DOCUMENTS

| 10,455,297 B1* | 10/2019 | Mahyar | H04N 21/4532 |
| 10,917,704 B1* | 2/2021 | Hamid | H04N 21/4725 |
| 2020/0021873 A1* | 1/2020 | Swaminathan | G06N 3/08 |

FOREIGN PATENT DOCUMENTS

CA 3 155 314 A1 5/2021

OTHER PUBLICATIONS

Non-Final Office Action received for U.S. Appl. No. 17/095,486 dated Aug. 31, 2021, 20 pages.
(Continued)

*Primary Examiner* — Omar S Parra
(74) *Attorney, Agent, or Firm* — Greenberg Traurig, LLP

(57) ABSTRACT

The disclosed computer-implemented method may include accessing media segments that correspond to respective media items. At least one of the media segments may be divided into discrete video shots. The method may also include matching the discrete video shots in the media segments to corresponding video shots in the corresponding media items according to various matching factors. The method may further include generating a relative similarity score between the matched video shots in the media segments and the corresponding video shots in the media items, and training a machine learning model to automatically identify video shots in the media items according to the generated relative similarity score between matched video shots. Various other methods, systems, and computer-readable media are also disclosed.

20 Claims, 13 Drawing Sheets

Related U.S. Application Data

(60) Provisional application No. 62/935,011, filed on Nov. 13, 2019.

(51) Int. Cl.
  *H04N 21/845* (2011.01)
  *G06N 20/00* (2019.01)
  *H04N 21/44* (2011.01)
  *G06V 20/40* (2022.01)
  *G06V 10/82* (2022.01)
  *G06V 10/44* (2022.01)

(52) U.S. Cl.
  CPC .............. *G06V 20/41* (2022.01); *G06V 20/46* (2022.01); *G06V 20/47* (2022.01); *G06V 20/48* (2022.01); *G06V 20/49* (2022.01); *H04N 21/44008* (2013.01); *H04N 21/4667* (2013.01); *H04N 21/4668* (2013.01); *H04N 21/845* (2013.01)

(56) References Cited

OTHER PUBLICATIONS

Notice of Allowance received for U.S. Appl. No. 17/095,486 dated Feb. 24, 2022, 18 pages.

International Search Report and Written Opinion received for PCT Application Serial No. PCT/US2020/060286 dated Feb. 9, 2021, 9 pages.

Sun et al., "Ranking Domain-Specific Highlights by Analyzing Edited Videos", European Conference on Computer Vision, Part 1, Lecture Noles in Computer Science 8689, Dec. 31, 2014, pp. 787-802.

International Preliminary Report on Patentability Chapter I received for PCT Application Serial No. PCT/US2020/060286 dated May 27, 2022, 8 pages.

* cited by examiner

AUTOMATIC TRAILER DETECTION IN MULTIMEDIA CONTENT

CROSS REFERENCE TO RELATED APPLICATION

This application is a continuation of U.S. Non-Provisional application Ser. No. 17/095,486, filed Nov. 11, 2020, which claims priority from and the benefit of U.S. Provisional Application No. 62/935,011, filed Nov. 13, 2019, the disclosures of which are incorporated, in their entirety, by this reference.

BACKGROUND

Movie trailer production is currently a lengthy and highly involved process, with many different people working to manually select shots to fit into a short time window that succinctly tells a story. Some traditional systems have attempted to generate trailers automatically. One such traditional system is Video Highlight Detection (VHD). VHD attempts to analyze a video and extract short video clips. These extracted video clips are then manually arranged into a movie trailer. The VHD process, however, is highly reliant on human supervision, with humans still being needed to manually identify and highlight moments in the movie as specific types of actions (e.g., skiing) or specific events (e.g., a dog show). Still further, VHD and other prior attempts to automatically generate trailers lacked the power and precision to properly analyze full-length movies. For example, traditional systems were unable to analyze full-length films while tracking the underlying storyline, distinguishing between different environments, or selecting shots based on emotional value. None of these traditional systems had the sophistication or depth to analyze emotion, environment, or storyline when attempting to automatically generate a trailer.

SUMMARY

As will be described in greater detail below, the present disclosure describes methods and systems for automatically training a machine learning (ML) model to recognize key moments in a film or television show that can be used as a trailer, as a hook clip, or as artwork for that film or tv show.

In one example, a computer-implemented method for automatically training a machine learning model to recognize key moments in a film or television show may include accessing media segments that correspond to a media item. Within this method, the media segments may be divided into discrete video shots. The method may further include matching the discrete video shots in the media segments to corresponding video shots in the media items according to different matching factors. The method may also include generating a relative similarity score between the matched video shots in the media segments and the corresponding video shots in the media items. Still further, the method may include training a machine learning model to automatically identify video shots in the media items according to the generated relative similarity score between matched video shots.

In some examples, training the machine learning model to automatically identify video shots in media items includes providing higher relative similarity scores as positive training data for the machine learning model, and providing lower relative similarity scores as negative training data for the machine learning model. In some embodiments, training the machine learning model to automatically identify video shots in media items includes providing matched video shots as positive training data for the machine learning model, and providing unmatched video shots as negative training data for the machine learning model.

In some cases, the matching factors may include a number of similar objects that appear across video shots, an amount of similar coloring across video shots, an amount of similar motion between video shots, an identification of similar film characters across video shots, or an identification of similar backgrounds across video shots.

In some examples, the computer-implemented method may further include providing, for each video shot in at least one of the media items, a recommendation score indicating how desirable each video shot is to have in a corresponding media item trailer.

In some cases, the machine learning model may be specific to an identified genre. In some embodiments, the media segments and the respective media items may include media segments and media items of the identified genre. The genre may be identified by recognizing one or more patterns in the media item and categorizing the media item as belonging to the identified genre.

In some embodiments, the computer-implemented method may further include accessing at least one different media item for which no corresponding media trailer has been generated, segmenting the different media item into multiple video shots, and applying the trained machine learning model to the different media item to generate a recommendation score for each video shot. In such cases, the recommendation score may indicate how desirable each video shot is to have in a corresponding media item trailer. The computer-implemented method may also include ranking the discrete video shots of the different media items according to each shots' respective recommendation score. Still further, the computer-implemented method may include automatically assembling the discrete video shots into a new media item trailer based on the ranking. The method may also include providing the ranked, discrete video shots to a media item trailer producer for arrangement into a media item trailer.

In addition, a corresponding system for automatically training an ML model to recognize key moments in a film or television show that can be used as a trailer for that film or tv show may include at least one physical processor and physical memory comprising computer-executable instructions that, when executed by the physical processor, cause the physical processor to: access media segments that correspond to at least one respective media item, where at least one of the media segments is divided into discrete video shots. The computer-executable instructions may further cause the physical processor to match the discrete video shots in the media segments to corresponding video shots in the corresponding media items according to one or more matching factors. The computer-executable instructions may further cause the physical processor to generate a relative similarity score between the matched video shots in the media segments and the corresponding video shots in the media items, and to train a machine learning model to automatically identify video shots in the media items according to the generated relative similarity score between matched video shots.

In some cases, the video shots automatically identified by the machine learning model may include a hook clip for at least one of the media items. The hook clip may include one or more video shots designed to generate interest in the corresponding media item. In some examples, the video shots automatically identified by the machine learning model may include one or more scenes of interest in at least one of the media items. In some embodiments, the video shots automatically identified by the machine learning model may include one or more media item video frames from which at least one film artwork image is derived.

In some examples, the computer-executable instructions may further cause the physical processor to filter and remove one or more of the identified video shots that are identified for use in at least one media trailer. In some cases, one or more of the filtered video shots that were removed from being used in at least one of the media trailers include a spoiler moment. In some embodiments, one or more of the filtered video shots that were removed from being used in at least one of the media trailers include sensitive content.

The above-described method may be encoded as computer-readable instructions on a computer-readable medium. For example, a computer-readable medium may include one or more computer-executable instructions that, when executed by at least one processor of a computing device, may cause the computing device to access media segments that correspond to at least one respective media item, where at least one of the media segments is divided into discrete video shots. The computer-executable instructions may further cause the physical processor to match the discrete video shots in the media segments to corresponding video shots in the corresponding media items according to one or more matching factors. The computer-executable instructions may further cause the physical processor to generate a relative similarity score between the matched video shots in the media segments and the corresponding video shots in the media items, and to train a machine learning model to automatically identify video shots in the media items according to the generated relative similarity score between matched video shots.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
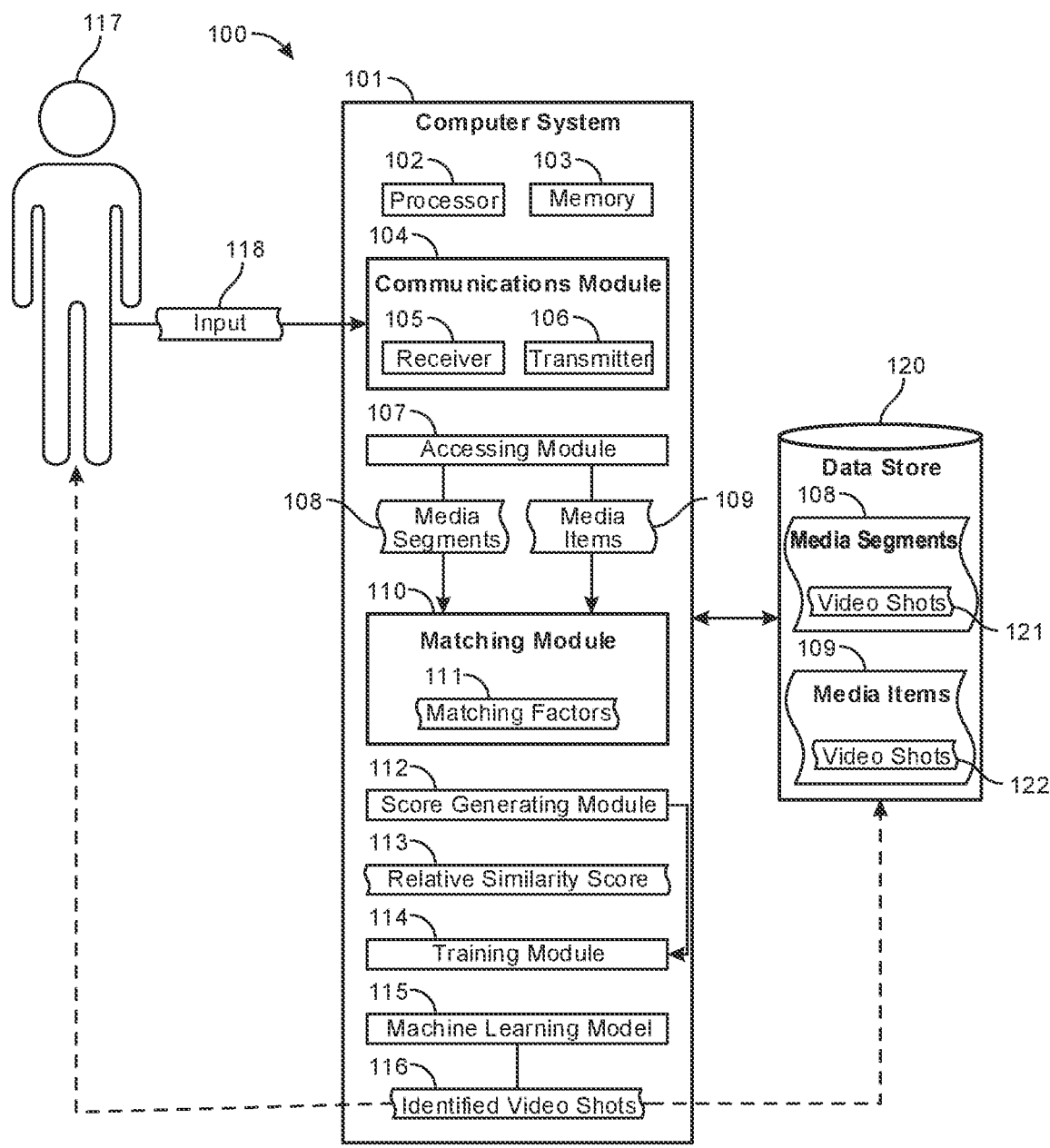
FIG. 1 illustrates a computing environment in which the embodiments herein are designed to operate.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to automatically training a machine learning (ML) model to recognize key moments in a video. As will be explained in greater detail below, embodiments of the present disclosure may provide these key moments to trailer producers who may use these key moments to assemble a movie trailer. Moreover, the embodiments of the present disclosure may use these key moments to automatically create movie trailers, create hook clips, identify interesting scenes, and generate representative artwork for a movie or tv show. This technique may augment the creative processes performed by trailer producers and others that generate media items related to videos.

A "trailer," as the term is used herein, may refer to any sequence of movie shots designed to generate interest in a corresponding movie. The trailer may include different movie shots from throughout the video, including video shots that highlight funny moments, that highlight certain characters, or moments that generally portray the theme of the movie. The trailer may include movie shots from many different parts of the movie, at least some of which may be out of order. This is contrasted with "hook clips" which may refer to portions of the movie that showcase a self-contained and compelling sequence of events. For instance, a hook clip may start at a given point in the movie and may run for a specified amount of time (e.g., 30-90 seconds). Whereas in movie trailers, shots may be arranged out-of-order and typically only run for a few seconds from any given scene. A hook clip may begin at a specific point in the movie and may run sequentially until the hook clip has ended. Both trailers and hook clips may be designed to generate interest in an underlying movie, with each approaching that goal in a different manner.

As noted above, prior attempts to automatically generate media trailers (including trailers for full-length films or television shows) still included large amounts of human involvement. For instance, as noted above, Video Highlight Detection (VHD) would analyze a media item (e.g., a basketball game or an action movie) and attempt to identify highlights from that game or movie. Once the highlights were identified, they could be extracted and manually arranged to form a string of highlights. For the VHD process to work properly, however, humans would need to supervise and perform many of the steps necessary to create the string of highlights. For instance, humans were still needed to manually identify and highlight moments in the game or film as being specific types of actions (e.g., vehicles driving in a car chase) or specific events (e.g., making a game-winning shot). Without a human manually identifying the various clips, the VHD system would not be able to correctly identify which clips should be highlights.

Moreover, VHD and other prior systems that attempted to automatically generate trailers typically lacked the power and precision to properly analyze full-length movies. For instance, full-length films typically last two to three hours or more. Prior systems were unable to handle an analysis that encompassed these long run times, while still keeping track of the underlying storyline. Moreover, traditional systems were incapable of distinguishing between different environments without a human manually identifying and categorizing the various environments. Still further, these traditional systems were incapable of automatically (without human intervention) identifying and selecting shots for a trailer, for a hook clip, or for artwork when the selection was based on emotional value. Accordingly, prior systems were heavily human-involved and human-controlled. In contrast, the embodiments described herein are designed to train a machine learning model to automatically, and without human involvement, identify video shots that can be used in a trailer, in a hook clip, in media artwork, or used in other ways. These identified video shots may then be used in various creative processes performed by trailer producers and others that generate hook clips, film artwork, or other video-related items.

Turning now to FIG. 1, a computing environment 100 is provided that includes a computer system 101. The computer system 101 may include software modules, embedded hardware components such as processors, or may include a combination of hardware and software. The computer system 101 may include substantially any type of computing system including a local computing system or a distributed (e.g., cloud) computing system. In some cases, the computer system 101 may include at least one processor 102 and at least some system memory 103. The computer system 101 may include program modules for performing a variety of different functions. The program modules may be hardware-based, software-based, or may include a combination of hardware and software. Each program module may use computing hardware and/or software to perform specified functions, including those described herein below.

The computer system 101 may include a communications module 104 that is configured to communicate with other computer systems. The communications module 104 may include any wired or wireless communication means that can receive and/or transmit data to or from other computer systems. These communication means may include hardware interfaces including Ethernet adapters, WIFI adapters, hardware radios including, for example, a hardware-based receiver 105, a hardware-based transmitter 106, or a combined hardware-based transceiver capable of both receiving and transmitting data. The radios may be cellular radios, Bluetooth radios, global positioning system (GPS) radios, or other types of radios. The communications module 104 may be configured to interact with databases, mobile computing devices (such as mobile phones or tablets), embedded or other types of computing systems.

The computer system 101 may also include an accessing module 107. The accessing module 107 may be configured to access various data items stored in data store 120. The data store 120 may be any type of local or remote data store including a network- or internet-based distributed data store. The data store 120 may store media segments 108, media items 109, and/or other data items. As used herein, the term "media segments" may refer to portions of a media item. A media item (e.g., 109) may be a full-length film, a television show, or other video or audio content. The media segments 108 may refer to portions of the media items 109. The portions may refer to substantially any length of media content, from a single video frame, to a clip of a few seconds long, to a clip of a few minutes long, to a larger portion that encompasses nearly all of the media item.

In some cases, the media segments 108 may be arranged in a specific order to tell a story. For example, in some embodiments, the media segments 108 may be arranged as a movie trailer that corresponds to one of the media items 109 (e.g., a full-length movie). In other cases, the media segments 108 may be arranged as a hook clip that presents a portion of the full-length movie or television show in an attempt to garner interest in the full movie. In still other cases, the media segments 108 may be arranged as a single image or a series of still images. These images may be used as artwork representing the corresponding movie or television show. Thus, the media segments 108 may correspond to media items 109 in the data store, and may represent some portion of those media items.

Throughout this disclosure, the term "media items" or "media items 109" may be used to refer to any type of media items including full-length films, television shows, television series, audio series, audiobooks, internet videos, streaming videos, or other types of media. For simplicity's sake, these media items will often be referred to herein simply as movies or films or full-length films, although it will be understood that similar principles may apply to any of the various types of media items. Each of the media items 109 may be comprised of multiple different video shots 122. These video shots may represent portions of a film shot from a specific camera, or shot from a specific angle, or include a specific film character (or set of characters), or include a specific object (e.g., a spaceship or a sword), or include specific dialog, or include a specific background, or include other identifiable features. Video shots are distinguished from video scenes, as video scenes themselves may include multiple video shots. A scene, for example, may begin and end in a specific setting, or with a specific background, or with specific characters, etc. Each scene may include multiple video shots 122, including perhaps shots from different cameras at different angles. The video shots within these scenes may be substantially any length in duration, and may be different for each type of media item. In some cases, the computer system 101 may be configured to segment the media items 109 into different video shots. In other cases, the computer system 101 may simply access media items that have already been divided up into video shots 122.

Similar to the media items 109, the media segments 108 may have their own corresponding video shots 121. In cases where the media segments 108 are movie trailers that correspond to movies, the video shots 121 may have corresponding video shots 122 in media items 109. Indeed, in cases where the media segments 108 comprise movie trailers, the movie trailers may each correspond to a specific full-length movie. The trailers may be designed to provide a preview of the movie and generate interest for the movie. In at least some of the embodiments described herein, the media segments 108 are commercially prepared movie trailers that correspond to feature-length movies. As such, the video shots 121 in the trailers may be taken from video shots 122 in the full-length movie (although it is possible that some video shots in the trailer were not used in the full-length movie). Thus, the accessing module 107 of computer system 101 may access these media segments 108 and media items 109 along with their associated video shots.

The matching module 110 of computer system 101 may be configured to match video shots 121 of the media segments 108 to video shots 122 of the media items 109. The matching module 110 may use various matching factors 111 to match the video shots 121 of the media segments 108 to the video shots 122 of the corresponding movie. These matching factors will be explained in greater detail below. Once the video shots 121 and 122 have been matched together, the score generating module 112 of computer system 101 may generate a relative similarity score 113 for each of the matched video shots. If the video shots appear to have a high degree of similarity (e.g., based on similar features, similar characters, similar background, similar audio, etc.), then those video shots may be confirmed as having been accessed from the movie for use in the movie trailer. If the video shots appear to have a lower degree of similarity, then the score generating module 112 will assign a lower relative similarity score 113, indicating that those video shots were likely not used in the movie trailer.

The relative similarity score 113 may be fed to the training module 114 which may train the machine learning model 115 to recognize which video shots were taken from the movie and used in the corresponding movie trailer. This training may then be applied to future films that have no corresponding movie trailer. In such cases, the trained machine learning model 115 may automatically identify video shots (e.g., 116) that are to be used in a trailer (or as a hook clip or as artwork) for a new film. These identified video shots 116 may each be assigned a score indicating their preferability for inclusion in a trailer. In some cases, the computer system 101, using the trained machine learning model 115, may generate the trailer automatically and provide it to the data store 120 for storage and potentially for dissemination to streaming service users. In other cases, the computer system 101 may provide the identified video shots 116 and the indication of preferability for inclusion in a trailer to a user (e.g., a movie producer or movie trailer specialist (e.g., 117)) to allow the user to create the movie trailer using the video shots selected by the trained machine learning model 115. These concepts will be described further below with regard to method 200 of FIG. 2 and with further regard to FIGS. 3A-13.

Figure 2:
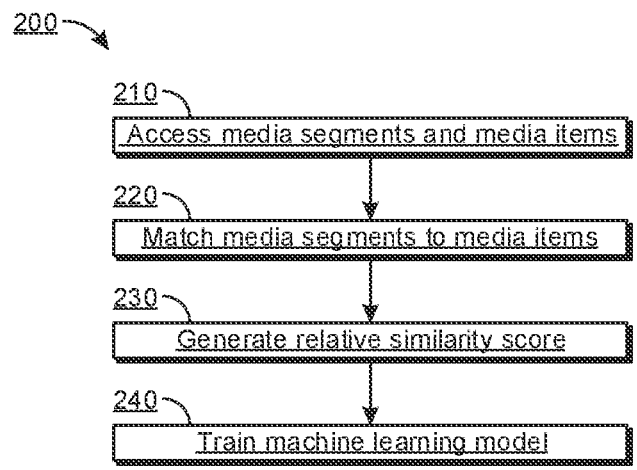
FIG. 2 is a flow diagram of an exemplary method for automatically training an ML model to recognize key moments in a film or television show.

FIG. 2 is a flow diagram of an exemplary computer-implemented method 200 for automatically training an ML model to recognize key moments in a film or television show. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, a method 200 for automatically training an ML model to recognize key moments in a film, television show, or other media item may include accessing media segments that correspond to at least one respective media item. As noted above, the accessing module 107 of computer system 101 may access media segments 108. These media segments 108 may correspond to media items 109. Each media item and media segment may be divided into discrete video shots 121/122. The method 200 may next include, at step 220, matching the discrete video shots 121 in the media segments 108 to corresponding video shots 122 in the corresponding media items 109 according to various matching factors 111. At step 230, the method may include generating a relative similarity score 113 between the matched video shots 121 in the media segments 108 and the corresponding video shots 122 in the media items 109. And, at step 240, the method may include training a machine learning model 115 to automatically identify video shots 116 in the media items according to the generated relative similarity score 113 between matched video shots. FIGS. 3A-3D illustrate an example of such a process.

Figure 3A:
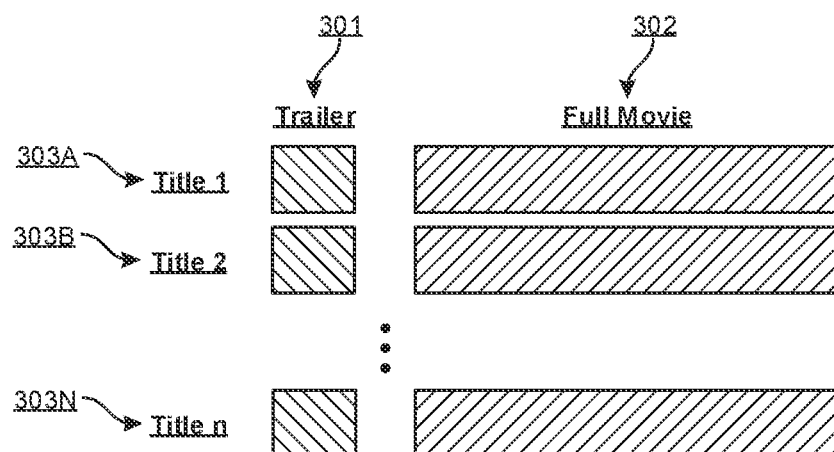
FIGS. 3A-3D illustrate a method flow in which a machine learning model is trained to automatically identify video shots for use in a media item trailer.
Figure 3B:
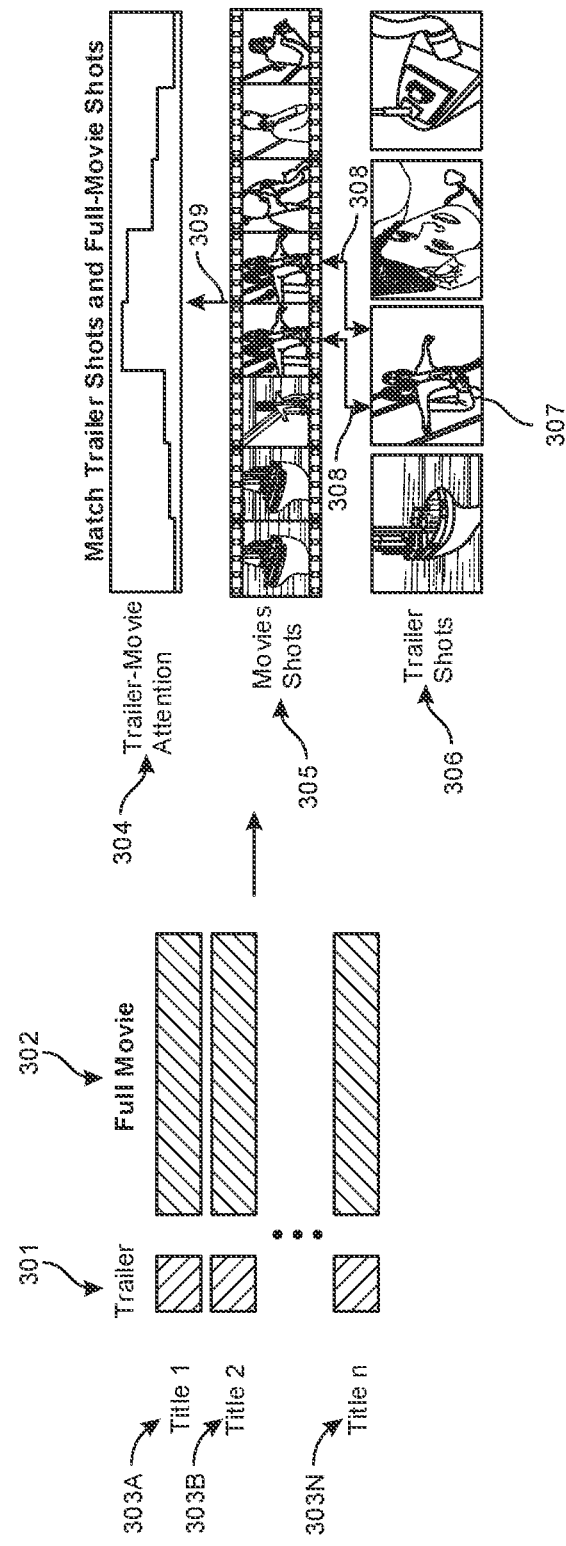

In FIG. 3A, for example, each movie title (e.g., 303A, 303B, 303N) has a trailer 301 and associated full movie 302. In some cases, a full movie may have more than one trailer but, at least in this example, each full movie has a single corresponding trailer. These trailers 301 and full movies 302 may be stored in data store 120 of FIG. 1. In FIG. 3B, video shots 306 from the trailers 301 are matched to video shots 305 in the corresponding movies 302. The video shots 306 from the trailers 301 may be matched to video shots 305 in the movies 302 according to one or more matching factors (e.g., 111 of FIG. 1). The matching factors 111 may include a wide variety of different factors that would help determine whether a video shot from a trailer matches a corresponding video shot (or series of shots) in a full movie.

For instance, the matching factors 111 may include an identification of similar film characters across video shots. If, in FIG. 3B for example, the system identifies two characters at 307, a correlation may be drawn between video shot 307 and video shot 308. The trailer-movie attention score 304 may rise at this point (309) indicating a high likelihood of a match. Other trailer video shots 306 do not appear to match the video shots 308 and, thus, have a lower matching score or "trailer-movie attention score" 304. Other matching factors may also be used, alone or in combination, including an amount of similar coloring across video shots, an amount of similar motion between video shots, the number of similar objects that appear across video shots, an identification of similar backgrounds across video shots, an identification of similar dialogue or score music, or other factors that may be used to identify similarities between video shots.

Figure 3C:
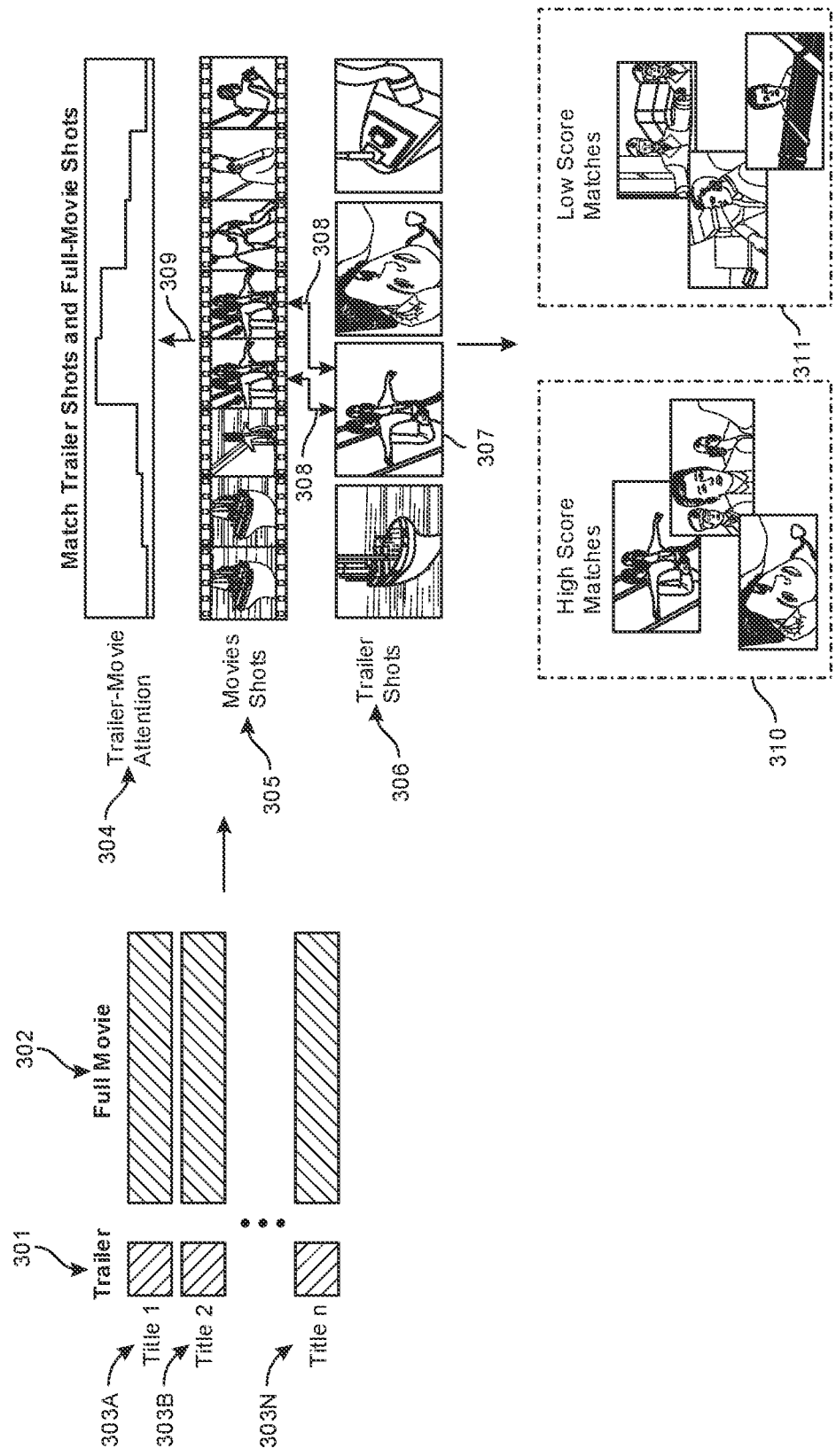

In FIG. 3C, each of the video shots has been assigned a matching score (e.g., relative similarity score 113 of FIG. 1). Some of the video shots from FIG. 3B have a high match score 310, while other video shots have a lower match score 311. In at least some embodiments, this matching score may be appended to each video shot as metadata, along with an indication of which matching factors led to that match score. Each of the video shots from FIG. 3C (e.g., 310 and 311) may be ranked in FIG. 3D based on their match score (e.g., at 312). Movie video shots 305 that had a relatively high match score (and were thus highly correlated with video shots from the corresponding trailer 301) would rank higher than movie video shots 305 that had a relatively low match score (and were thus not correlated or were only loosely correlated with video shots 306 from the movie 301) (as shown at 313). This ranking information may be used to train the machine learning model 115 to correctly identify video shots whose inclusion would be preferable in a movie trailer. Over time, and with many comparisons between commercial trailers and their corresponding movies, the machine learning model 115 may learn to identify which video shots from a movie encompass a "trailer moment" and should be included in a trailer (or in a hook clip, or as an interesting scene, or as artwork for the film).

Figure 3D:
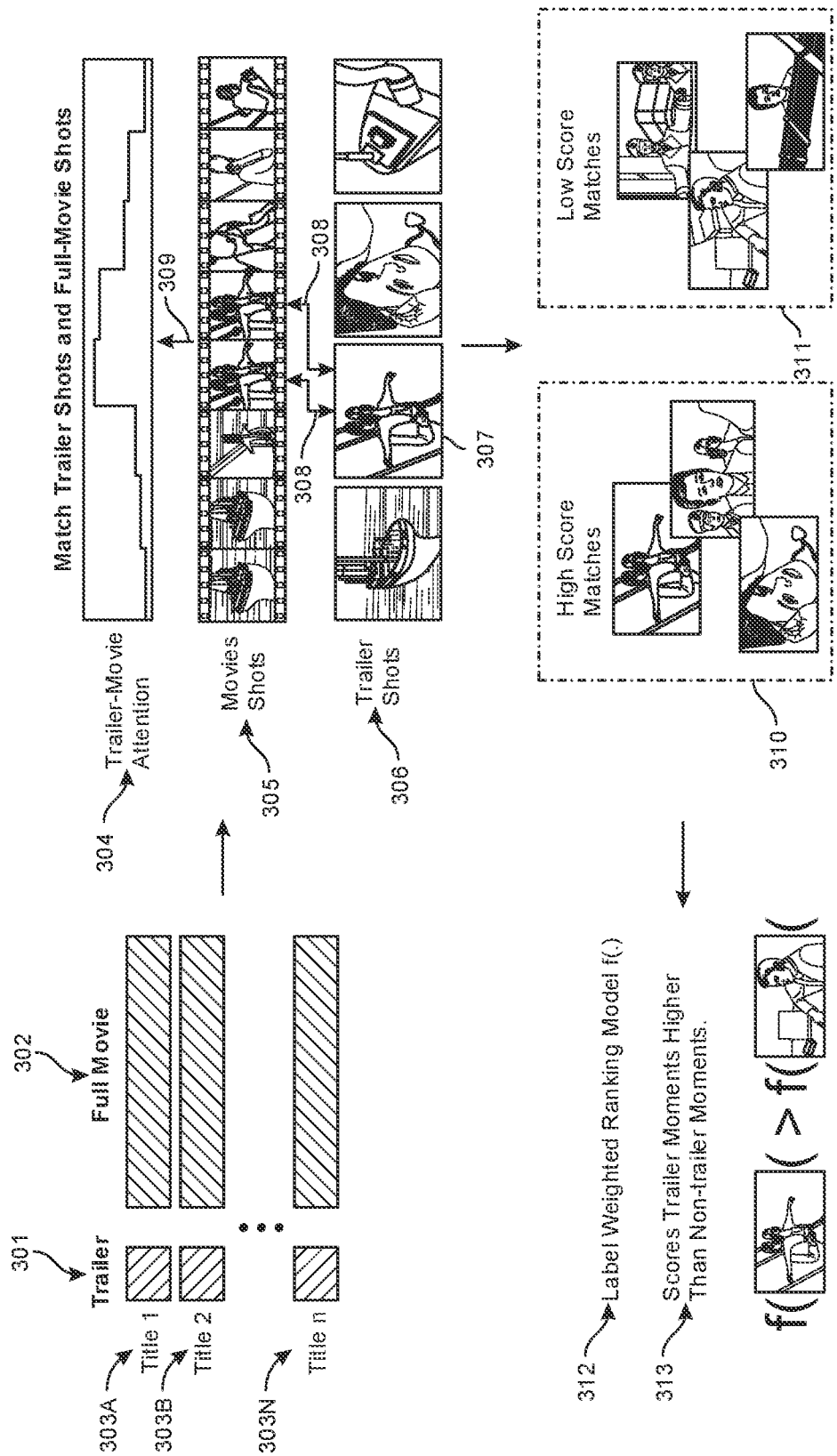

More specifically, training the machine learning model 115 to automatically identify video shots in media items may include providing higher relative similarity scores 113 as positive training data for the machine learning model 115. This positive training data may indicate to the machine learning model 115 that a positive correlation was identified for those video shots between the trailer and the movie. Conversely, training the machine learning model 115 to automatically identify video shots in media items may include providing lower relative similarity scores 113 as negative training data for the machine learning model. In this manner, the positive and negative training data may help the ML model to learn to automatically identify video shots in a movie that would be most preferable to use in a trailer for that movie. Still further, training the machine learning model 115 to automatically identify video shots in media items may include providing matched video shots as positive training data for the machine learning model, and providing unmatched video shots as negative training data for the machine learning model, as generally shown in FIGS. 3C and 3D. Matched video shots may be used as training data in addition to or as an alternative to using the relative similarity scores as training data.

Figure 4:
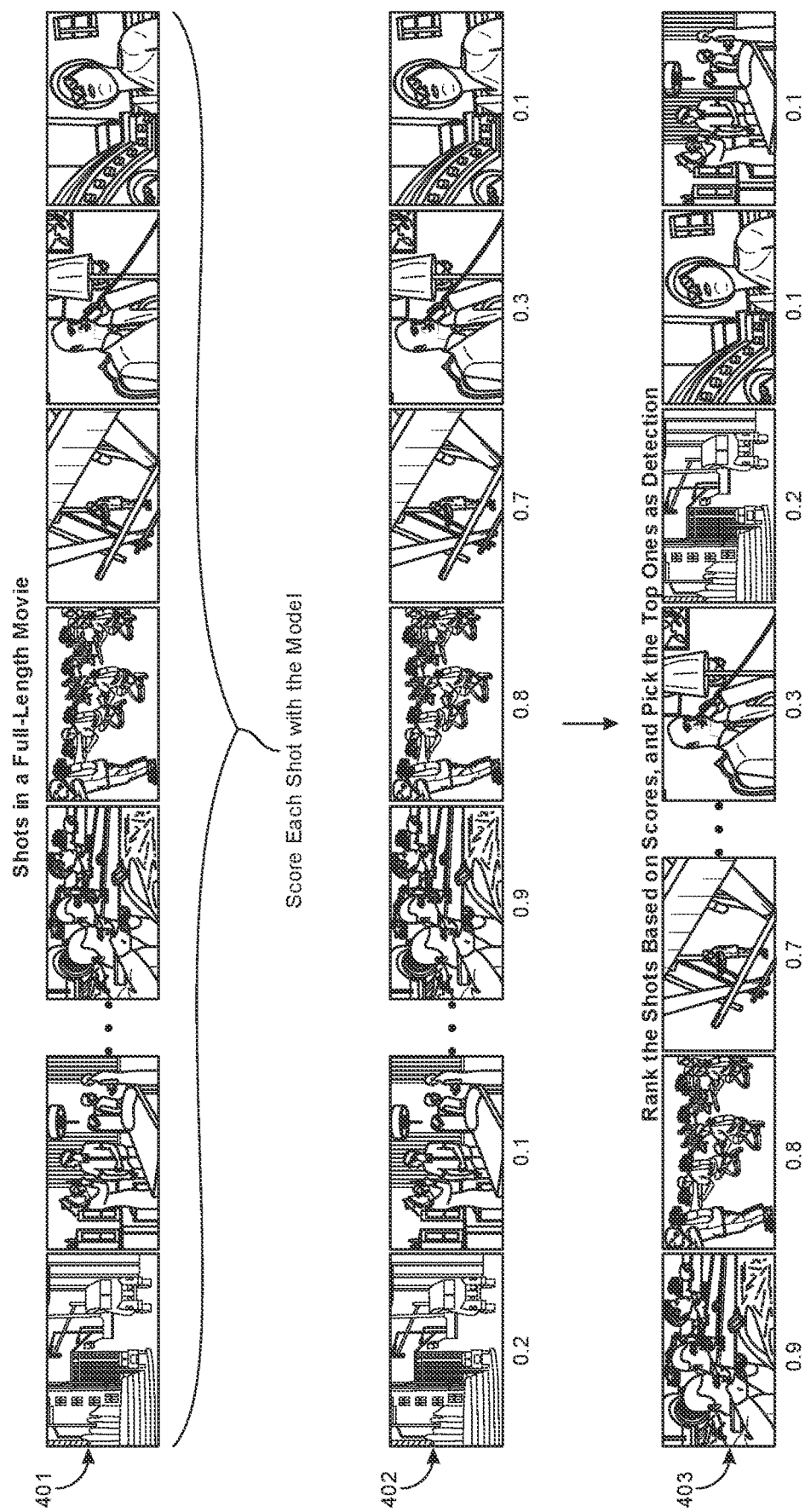
FIG. 4 illustrates an embodiment in which a trained machine learning model is implemented to automatically identify video shots for use in a media item trailer.

Once the machine learning model 115 has been trained, the model may be configured to provide, for each video shot, a recommendation score indicating how desirable each video shot is to have in a corresponding media item trailer. This recommendation score may indicate, for example, on a scale of 0-1 or 1-10 how desirable it would be to have that shot in a trailer. For instance, as shown in FIG. 4, the machine learning model 115 of FIG. 1 may analyze the video shots 401 in a full-length movie. Each video shot is assigned a recommendation score indicating how desirable each video shot is to have in the media item's trailer. As shown at 402, some of the video shots have relatively low recommendation scores (e.g., 0.2, 0.1, 0.3, etc.), while some of the video shots have a relatively high recommendation score (e.g., 0.9, 0.8, 0.7). The machine learning model 115 (or a separate ranking module) may then rank the video shots based on their recommendation scores. An example of this is shown in 403 where the video shots are ranked and ordered according to their recommendation score, highest to lowest. Those video shots having higher recommendation scores may then be automatically added to a trailer for a movie, or may at least be placed in higher consideration for inclusion in a trailer for the movie.

FIGS. 5-10 illustrate, in greater detail, how movie shots are matched to trailer shots through the use of a Co-Attention module that is designed to learn trailer moments and a Contrastive Attention module that is designed to maximize the comparative contrast between features of key trailer moments and non-key moments. As the term is used herein, a "trailer moment" or "key trailer moment" may refer to a video shot or series of video shots that would be advantageous to have in a trailer. While these are referred to herein as trailer moments, it will be understood that these moments may be hook clip moments, interesting scene moments, film artwork moments, or other noteworthy moments within the movie that may be identified and assembled for other purposes.

Indeed, movies are made of moments and, while not all of the moments are equally important, some of these moments may be better suited to grabbing an audience's attention and conveying a movie's theme. Viewers have many different films to choose from at any given time, and trailers can help those viewers select which movie or television show they actually want to view. Key moments in the form of short video clips can make browsing for movies more efficient, allowing audiences to quickly understand the theme or premise of the movie by previewing the movie trailer. As such, trailers aim to provide well-chosen moments aimed to attract an audience to the movie. The key moments are usually drawn from the most exciting, funny, or otherwise noteworthy parts of the film, but are shown in abbreviated form and usually without spoiler content.

As noted previously, traditional systems have implemented manual annotations to identify these exciting, funny, or noteworthy parts of the film. In contrast, the embodiments described herein create a supervision signal by matching moments between the trailers and the corresponding movies (as generally shown in FIGS. 3A-3D). Specifically, the systems herein implement a Co-Attention module (e.g., 506 of FIG. 5) to measure the coherence between the video shots from trailers and movies. The measured coherence may result in a set of the best- and worst-matched shots from the corresponding movies. These shots may be weakly labeled as positive and negative samples. The Co-Attention module 506 may be updated during and throughout the learning process, as the training is performed in an end-to-end fashion.

Traditional systems have further failed by treating individual short clips in long videos separately, without exploring their relationships to each other. The systems described herein recognize that trailer moments follow certain common patterns and are distinguishable from the non-trailer moments. For example, although action movies tell different stories, many of their corresponding trailer moments may include video shots with intensive motion activities. Some traditional systems also attempted to leverage video duration as the supervision to train highlight detectors. As noted in FIG. 6, however, the duration distribution 600 for trailer and non-trailer shots indicates that the duration 602 of these two kinds of shots is quite similar (according to noted percentages 601), thus preventing duration from being used as a supervisory factor in training.

To incorporate prior knowledge regarding trailer patterns and video shot duration into a database, the embodiments herein also provide a Contrastive Attention module 503 that may be configured to ensure that the feature representations of the trailer moments are highly correlated, while at the same time encouraging a high level of contrast between trailer and non-trailer moments. In this way, the features of trailer moments may form a compact clique in the feature space and may better stand out from the features of the non-trailer moments. At least in some cases, these two modules (i.e., the Co-Attention module 506 and the Contrastive Attention module 503) may be combined into a three-dimensional (3D) convolutional neural network (CNN) 502 architecture that may be employed as a feature encoder with a scoring function to produce the ranking score for each video shot in the movie. This integrated network may be referred to herein as a Co-Contrastive Attention Network (CCANet). In at least some embodiments, the CCANet may be trained using a database of many different movie-trailer pairs, representing hundreds or thousands of hours of media content. Many of the embodiments described herein, in empirical testing, have outperformed current traditional supervised approaches in selecting video shots that are most preferable to include in a trailer or other media segment.

Figure 5:
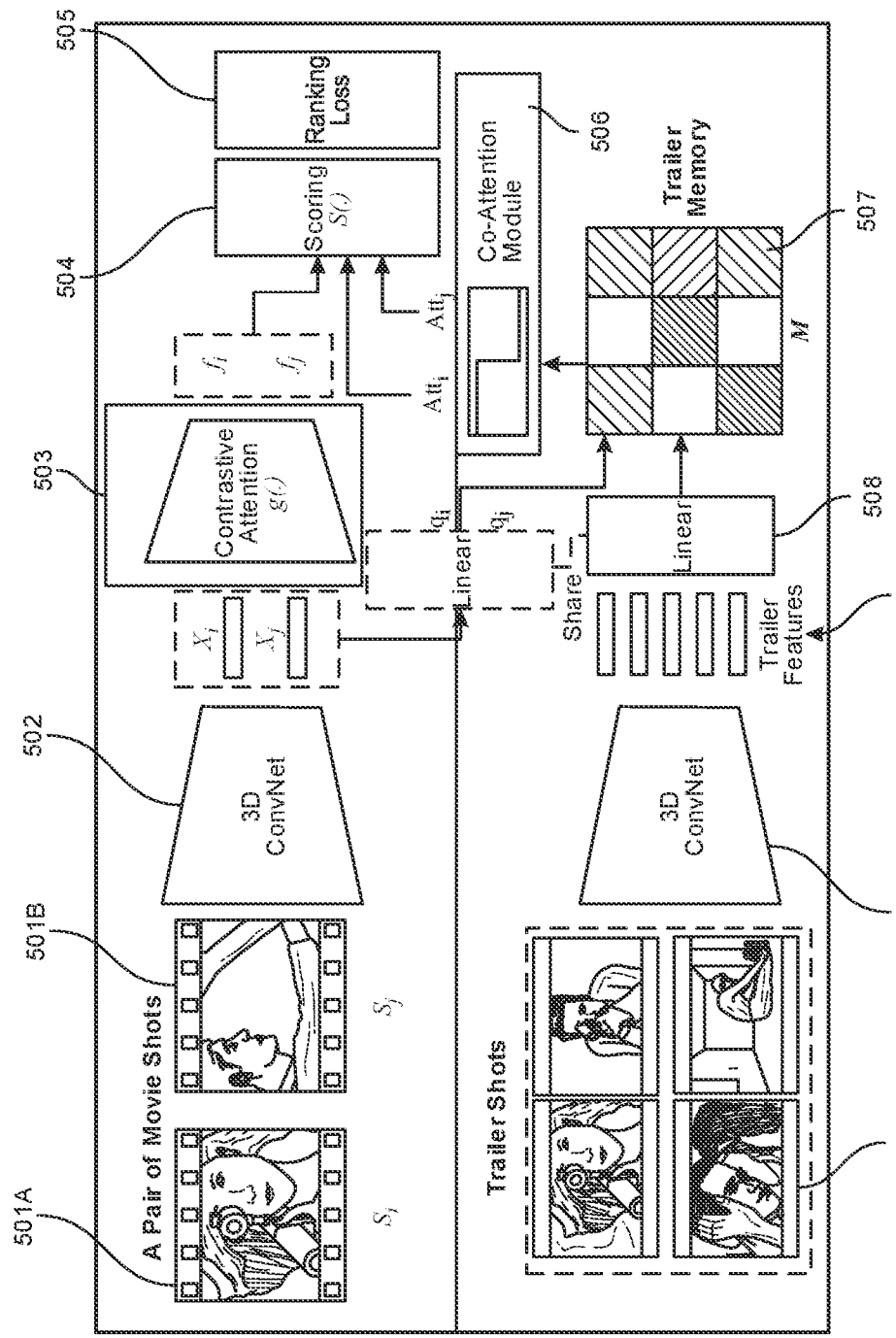
FIG. 5 illustrates an embodiment in which a contrastive attention module and a co-attention module are used in conjunction to automatically identify video shots for use in a media item trailer.
Figure 6:
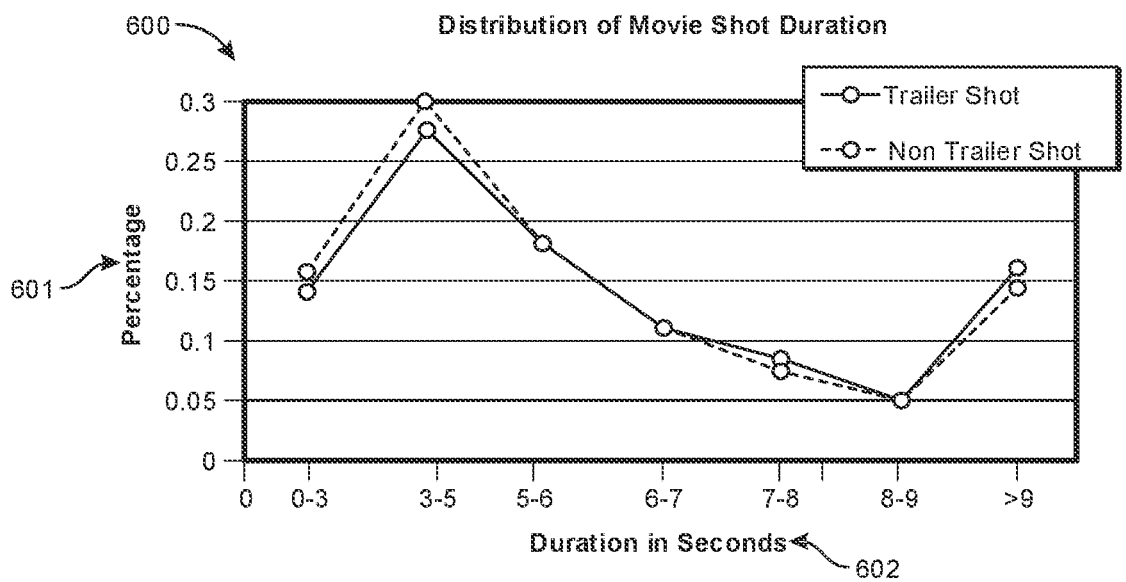
FIG. 6 illustrates a chart outlining a distribution of movie shot durations.

The CCANet of FIG. 5 may be trained without any human-applied labels or annotations. The CCANet may be trained with weak supervision from previously generated movie trailers. The CCANet may also incorporate the "contrastive" relationships into the learning process so that trailer moments can be distinguished from other, non-trailer moments. In some cases, the CCANet may be trained using data provided in a Trailer Moment Detection Dataset (TMDD). The TMDD may be constructed to include multiple movies in full length (e.g., 100+) paired with their official movie trailers. The movies may be split into multiple different domains according to genre including, for example, "Action," "Drama," and "Sci-Fi." Each domain may have multiple (e.g., 50) movie-trailer pairs. The systems described herein may be configured to train a Movie Trailer Moment Detection (MTMD) model for each domain, which draws from the idea that the key moments may be highly domain-dependent (e.g., a fighting moment might be crucial in an action movie but not in a romantic drama).

The systems described herein may define a movie moment as a video shot that consists of consecutive frames in one camera recording time. The systems may implement shot boundary detection or other shot identification methods to segment movies and trailers into the different video shots. Overall, the TMDD may include hundreds of thousands of movie shots (or more) and tens of thousands of trailer shots (or more). To build the ground-truth for the CCANet without requiring humans to annotate the key moments, the systems conduct visual similarity matching between trailers and movies at the shot-level and then manually verify the correctness of the matches. The shots occurring both in trailers and full-length movies are regarded as the ground-truth key moments in the movie. In at least some embodiments, the annotations obtained in this way may be used for performance evaluation and, in other embodiments, the annotations may be used for training the ML model. The trailers themselves may be leveraged to learn key movie moments without using human annotations.

As shown in FIG. 5, the Co-Attention module 506 and the Contrastive Attention module 503 may be integrated into a unified CCANet. The CCANet of FIG. 5 may be configured to learn a scoring function S(.) (504) that predicts a "trailerness" score or a recommendation score of a movie shot (e.g., 501A and/or 501B) given its features as input, where the features are extracted from the individual shot by a 3D CNN (or other type of neural network). Once the recommendation score has been generated, the CCANet may rank movie shots 501A/501B (at 505) based on the predicted scores from the scoring function 504. The top-ranked movie shots may be deemed as key trailer moments that can be used to create trailers. Specifically, instead of relying on human annotations to create the pairwise shots for learning the S(.) scoring function (504), the systems herein may create movie shot pairs 501A/501B based on the Co-Attention scores generated by the Co-Attention module 506 between trailer shots 501C and movie shots 501A/501B. Additionally, the Contrastive Attention module 503 may be implemented to augment the 3D features 509 so as to explore the relationships between the trailer shots 501C and the non-trailer shots (i.e., movie shots that were not deemed to be key trailer moments).

The embodiments described herein may be configured to leverage the Co-Attention between movies and trailers to modify the basic ranking loss 505 for MTMD. At least some of the embodiments herein may assume that a movie dataset D can be divided into two non-overlapping subsets D={D⁺, D⁻}, where D⁺ contains the shots of key moments, and D⁻ contains the shots of non-key moments. In this example, $s_i$ may refer to a movie shot, and the 3D features extracted from the shot $s_i$ are $x_i$. The systems herein may rank the shots of key moments higher than the shots of non-key moments. As such, the systems herein may construct training pairs $(s_i; s_j)$ such that $s_i \varepsilon D^+$ and $s_j \varepsilon D^-$.

Co-attention between trailer shots and movie shots may be determined, at least in some embodiments, in the following manner. An element T may refer to a set of $N_t$ shots in a trailer. The systems herein may encode each $t_i \varepsilon T$ into a 3D feature. As shown in FIG. 5, a linear layer 508 may be applied to map the trailer shot features into a memory having specified dimensions for each memory vector. Given the feature $x_i$ of shot $s_i$ from a full movie, the systems herein may generate a query $q_i$ by applying the linear layer to $x_i$. The Co-Attention may be calculated as the maximal convolution activation between the query $q_i$ and the vectors in M, as shown in Eq. 1 below.

$$ATT_i = \max_{T \varepsilon N_t}(q_i \otimes mT) \qquad \text{Eq. 1}$$

Figure 7:
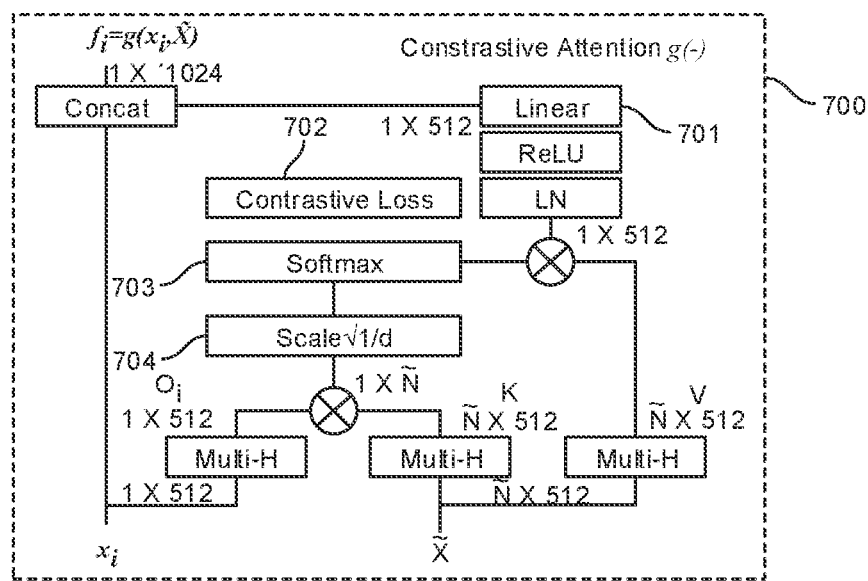
FIG. 7 illustrates an embodiment of a contrastive attention module.

The Co-Attention score $ATT_i$ may be configured to measure the coherence of shot $s_i$ in the movie to each of the shots in the trailer T. A large $ATT_i$ value may indicate that the shot $s_i$ is highly correlated to the trailer and therefore is a potential key moment in the movie. In some cases, the ranking loss 505 may be configured to assume that the system has annotations for constructing the training set $D^+$ and $D^-$. However, as noted above, human-applied annotations require extensive efforts and domain knowledge to generate the annotations. To train the machine learning model without access to human annotations, the systems herein may leverage the trailer to predict the attention score $ATT_i$ and use it as a "soft label" to measure the importance of shot $s_i$ in the full movie. Additionally, as shown in FIG. 7, the Contrastive Attention module 700 may be implemented to augment the feature $x_i$ of shot $s_i$ into $f_i$. With the soft labels and augmented features, the learning object may be rewritten to provide a scaling factor 704 and a separate variable to identify the validness of a pair $(s_i; s_j) \varepsilon P$ to the loss. In this manner, the systems herein may assign a large weight to the contrastive pair where the difference between $ATT_i$ and $ATT_j$ is significant and, therefore, should be treated as a confident training sample. The variable may be used to determine the order of the predicted scores based on their Co-Attention values. This is different from traditional approaches of learning with Pseudo-Label (PL). In PL, labels are collected offline from predictions made by the model. However, in contrast, the Co-Attention module described herein updates the label predictions in the end-to-end training process, as generally shown in FIG. 5.

The embodiments described herein may also be configured to augment features via the Contrastive Attention module 700. The Contrastive Attention module 700 may be configured to exploit the contrastive relationship among movie and trailer shots. Given a target shot $s_i$ and an auxiliary shot set S with N shots, the systems herein may be configured to extract a 3D visual feature and a feature set, respectively. The systems herein may apply a support feature set to augment the extracted visual feature. In at least some cases, the systems herein may attempt to make the attention contrastive such that the features of key moments can form a compact clique in the feature space and stand out from the features of the non-key moments.

Various linear layers (e.g., 701) and potentially other algorithms (e.g., Softmax 703) may be used to map $x_i$ and $\tilde{X}$ to a query vector $o_i$ and key matrix K, respectively, where d is the output channel number of the linear layers. The attention score may be used to weight the contribution of shots in S to augmenting $s_i$. The systems herein may also apply another linear layer to map $\tilde{X}$ to a value matrix V. As shown in FIG. 5, a 3×3 matrix 507 may be provided where each row represents a shot in trailer, and each column represents a shot in a corresponding full-length movie. Given an input trailer shot 501C, the system compares similarity of the trailer shot to some or all full-length movie shots 501A/501B, illustrating one row of similarity for each movie shot. More specifically, the system calculates the trailer and movie shots' pairwise similarity (for each shot). The matrix 507 may be of substantially any size. For instance, if there are M shots in a movie trailer, and N shots in the corresponding movie, the matrix would be a M×N sized matrix indicating similarity metrics, with N similarity values. In the example matrix 507, lighter coloring indicates higher similarity and is thus weighted higher, while darker coloring indicates lower similarity between trailer and video shots and is thus weighted lower by the system.

Continuing the flow of FIG. 5, the systems described herein (e.g., CCANet) may construct an auxiliary shot set S for a specific $s_i$ and may regularize the feature augmentation discussed above. Noting that the cross-video key moments share common patterns and further noting that the key and non-key moments in the same video are supposed to be contrastive, the systems herein choose both common key moments and non-key moments to construct S. In particular, given a shot $s_i$ in a mini-batch during training, the systems collect the key moment shots across videos as well as the non-key moment shots surrounding $s_i$ in the same video into the auxiliary shot set S. The key and non-key moment shots in the supportive set S may be denoted by S+ and S−, respectively. In some cases, a calculated contrastive loss 702 may be implemented as a regularizer to explicitly impose the contrastive relation between the key and non-key moments. Various algorithms may be implemented to map the Co-Attention score to values of 0 or 1, which is a differentiable function and may be incorporated into the backpropagation of the learning process. The systems then combine the Co-Attention ranking loss and the calculated contrastive loss as the training objective of the CCANet.

At least in some embodiments, the effectiveness of the CCANet may be evaluated on the dataset provided in the TMDD. Under a specific movie genre containing a specific number of movies (e.g., 50 movies), the test implementations may randomly split the movies into the training and test set containing, for example, 45 and 5 movies respectively. In at least some experiments, the test implementations repeat the split a specified number of times (e.g., three times) and report the average across the three runs as the final result. During testing, the movie shots may be ranked based on the predicted score and then compared with a human-verified "key moment" ground-truth obtained by matching shots between trailers and movies as described in relation to FIG. 5 above.

Figure 8:
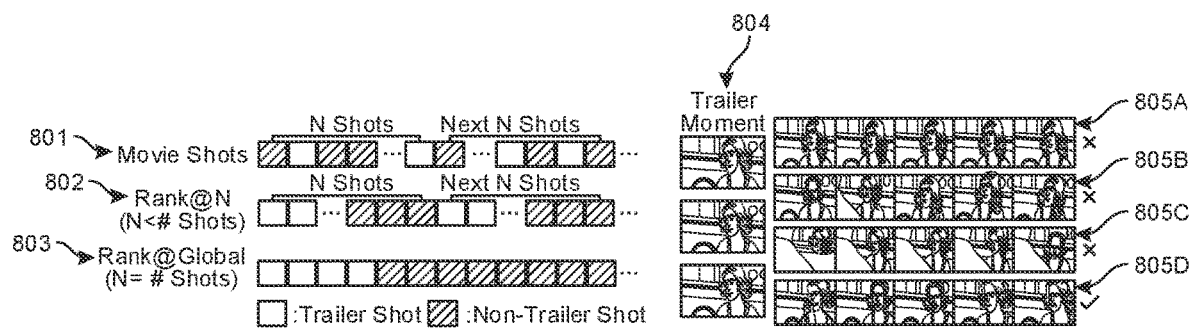
FIG. 8 illustrates an embodiment in which media trailer moments are identified and ranked.
Figure 9:
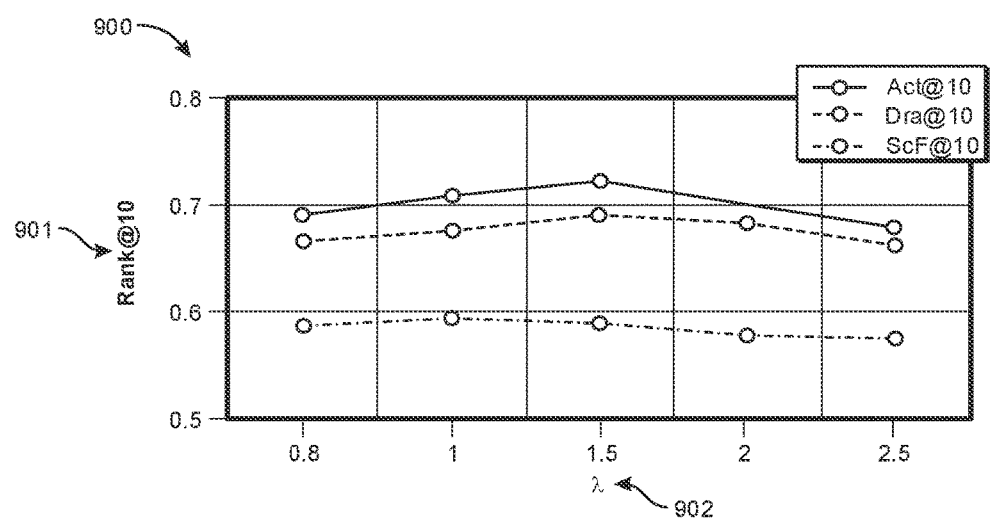
FIG. 9 illustrates a chart in which performance variance is ranked for different genres of media items.

For the evaluation metric, the systems herein may be configured to calculate average precision (AP) on each test video to measure the shot ranking performance. In order to achieve a fine-grain local view on the ranking performance for each video, the systems herein may adapt AP to a Rank@N metric. This Rank@N metric is generally illustrated in FIG. 8. As shown in FIG. 8, the systems herein may be configured to examine the ranking average precision within every N consecutive shots in the movie and then average them across the entire movie as the performance metric 802. Rank@Global (803) is equivalent to AP where N equals the number of shots 801 in the movie. The systems herein may calculate the results on each movie and average them across all test movies as the overall performance. Accordingly, as shown, trailer moments 804 are found in video shots 805A, but not in shots 805B-805D. In FIG. 9, empirical performance variances and rankings 901 are shown in chart 900 across action movies, drama movies, and science fiction movies. The systems herein may be configured to change the λ value (902) and report the performance of the proposed CCANet.

Thus, in this manner, movie shots and trailer shots may be compared and ranked based on their similarity. As noted above, at least in some cases, these movie and trailer video shots may be specific to certain genres. Stated another way, the machine learning model (e.g., 115 of FIG. 1) may be specific to an identified genre. Thus, in some cases, each genre of film may have its own specially trained machine learning model. In such cases, the media segments 108 and the respective media items 109 of FIG. 1 may include media segments and media items of that specific genre. For each film or television show, the genre may be identified by recognizing various patterns in the media item (e.g., specific patterns such as guns or explosions, lengthy dialogue, space backgrounds, etc.) and categorizing the media item as belonging to the identified genre. Once a movie or trailer has been classified into a specific genre, the computer system 101 may apply metadata to that movie or trailer, labeling it as being part of the identified genre.

In some embodiments, the trained machine learning model 115 may be implemented to automatically generate a trailer for a movie. During this process, the accessing module 107 of FIG. 1 may access a media item for which no corresponding media trailer has been generated. Accordingly, in this case, the machine learning model 115 is generating a trailer without having any prior trailer shots to compare the full-length movie to. In this process, the computer system 101 may be configured to segment the media item into multiple different video shots (e.g., 122) and then apply the trained machine learning model 115 to the new media item to generate a recommendation score for each video shot 116 identified by the model. This recommendation score (e.g., the "trailerness score") may indicate how desirable each video shot would be to have in a corresponding trailer for that movie. Accordingly, upon conclusion of this step, each video shot in the movie would have a recommendation score, indicating whether that video shot should be included in a trailer for that movie.

Figure 10:
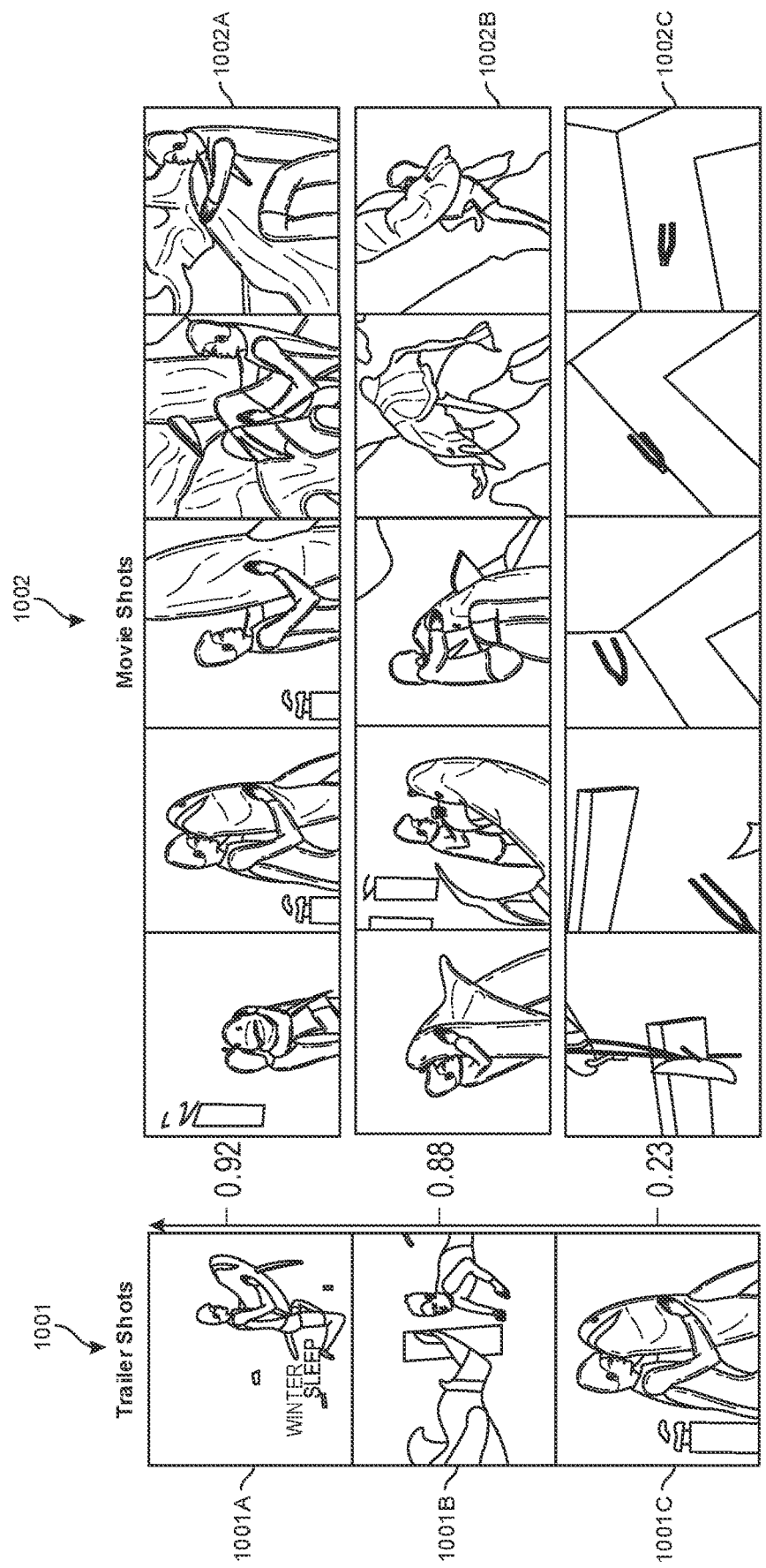
FIG. 10 illustrates an embodiment in which normalized co-attention scores are provided between media trailer and media item video shots.

For example, as shown in FIG. 10, trailer shots 1001 may include three separate trailer shots 1001A, 1001B, and 1001C. Corresponding movie shots 1002 shows three different rows of movie shots, ranked from lower to higher. For instance, the lowest-ranked movie shots (1002C) have a relatively low ranking of 0.23 on a scale of 0-1. As can be seen in FIG. 10, the movie shots in row 1002C have little to do with the trailer shot 1001C, leading to the low recommendation score. Movie shots 1002B potentially have more to do with trailer shot 1001B, showing some similar features between the movie shots and the trailer shot. The movie shots 1002B have a higher recommendation score of 0.88, indicating that they are fairly close to the trailer shot 1001B. Still further, the movie shots 1002A have a recommendation score of 0.92 in relation to trailer shot 1001A, indicating that the movie shots 1002A are most likely video shots of the same scene, or at least share many similar features between the two.

This ranking process, in which the discrete video shots of the new media item are ranked according to each shots' respective recommendation score, is also shown in row 403 of FIG. 4, where each video shot is ranked according to how desirable that shot would be to include in the trailer. In some cases, the machine learning model 115 may be used to automatically create the trailer based on the recommendation score, based on the rankings, and based on knowledge about the film and/or its genre. The machine learning model 115 may take into account storyline, emotional value, environment, or other factors when assembling the movie trailer. In at least some cases, the trailer may include scenes that are out-of-order with respect to the ordering in the full-length film. Thus, some video shots may be shown in a different order in the trailer automatically produced by the machine learning model 115 than the order of their appearance in the full-length movie. In other cases, the ranked, discrete video shots may be provided to a media item trailer producer (e.g., 117) for arrangement into a media item trailer. The trailer producer may then provide inputs 118 that select which video shots (from the ranked video shots 403) are to be used in the trailer. In this manner, the ranked video shots may be used as input by producers or other users in their attempt to craft trailers, hook clips, film artwork, or other video-related items.

As noted above, many of the embodiments described herein are described with reference to a movie trailer. However, it will be understood that any of the embodiments described herein may be used to perform other functions including training a machine learning model to create hook clips from the video shots of a full-length film, or training the ML model to identify interesting scenes in a movie, or training the ML model to identify video frames from which film artwork images may be derived. Accordingly, the machine learning model 115 may be trained to perform a wide variety of different functions. Similar to operation with a movie trailer, the machine learning model 115 may use recommendation scores 402 and/or video shot rankings 403 to generate the hook clips, or to identify the interesting scenes in a movie, or to generate artwork that may be most representative of a full-length movie.

Throughout this trailer or hook clip generation process, the machine learning model 115 may be trained to filter and remove some of the identified video shots that are identified for use in the trailer/hook clip/artwork. Indeed, in some cases, video shots may include sensitive content (e.g., blood, cursing, sex, etc.) or may include spoilers that would reveal portions of the movie that the movie creators would not want to include in the trailer. In such cases, the computer system 101 and/or the machine learning model 115 may be configured to perform one or more post-processing steps to identify, filter out, and remove these video shots. In some cases, the computer system 101 or machine learning model 115 may identify these shots using specific patterns. In other cases, the computer system 101 or machine learning model 115 may identify and filter these video shots according to metadata indicating where spoilers are located or where potentially objectionable content is located. Thus, in this manner, the machine learning model 115 may be configured to not only identify and rank which video shots should be included in a trailer, the ML model may also identify and filter out some video shots that would not be advisable to include in a trailer.

In addition, a corresponding system for automatically training an ML model to recognize key moments in a film or television show that can be used as a trailer for that film or tv show may include at least one physical processor and physical memory comprising computer-executable instructions that, when executed by the physical processor, cause the physical processor to: access media segments that correspond to at least one respective media item, where at least one of the media segments is divided into discrete video shots. The computer-executable instructions may further cause the physical processor to match the discrete video shots in the media segments to corresponding video shots in the corresponding media items according to one or more matching factors. The computer-executable instructions may further cause the physical processor to generate a relative similarity score between the matched video shots in the media segments and the corresponding video shots in the media items, and to train a machine learning model to automatically identify video shots in the media items according to the generated relative similarity score between matched video shots.

The above-described method may be encoded as computer-readable instructions on a computer-readable medium. For example, a computer-readable medium may include one or more computer-executable instructions that, when executed by at least one processor of a computing device, may cause the computing device to access media segments that correspond to at least one respective media item, where at least one of the media segments is divided into discrete video shots. The computer-executable instructions may further cause the physical processor to match the discrete video shots in the media segments to corresponding video shots in the corresponding media items according to one or more matching factors. The computer-executable instructions may further cause the physical processor to generate a relative similarity score between the matched video shots in the media segments and the corresponding video shots in the media items, and to train a machine learning model to automatically identify video shots in the media items according to the generated relative similarity score between matched video shots.

Accordingly, systems and methods are provided for automatically training a machine learning (ML) model to recognize key moments in a film or television show that can be used as a trailer, as a hook clip, or as artwork for that film or tv show. Furthermore, upon training the ML model to recognize these key moments, the systems and methods may further automatically assemble and generate a trailer entirely without human intervention, where the trailer accurately portrays the underlying movie without showing sensitive content such as spoilers. These systems and methods greatly advance the state of the art in this area, as demonstrated through empirical data when compared to traditional systems.

Figure 11:
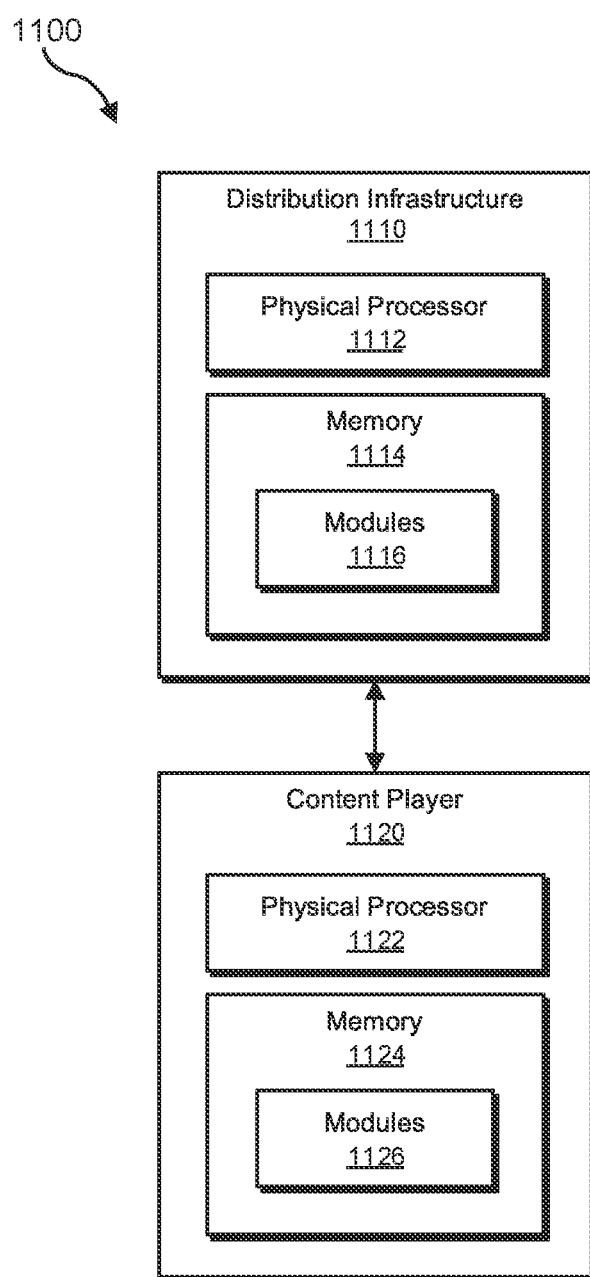
FIG. 11 is a block diagram of an exemplary content distribution ecosystem.
Figure 12:
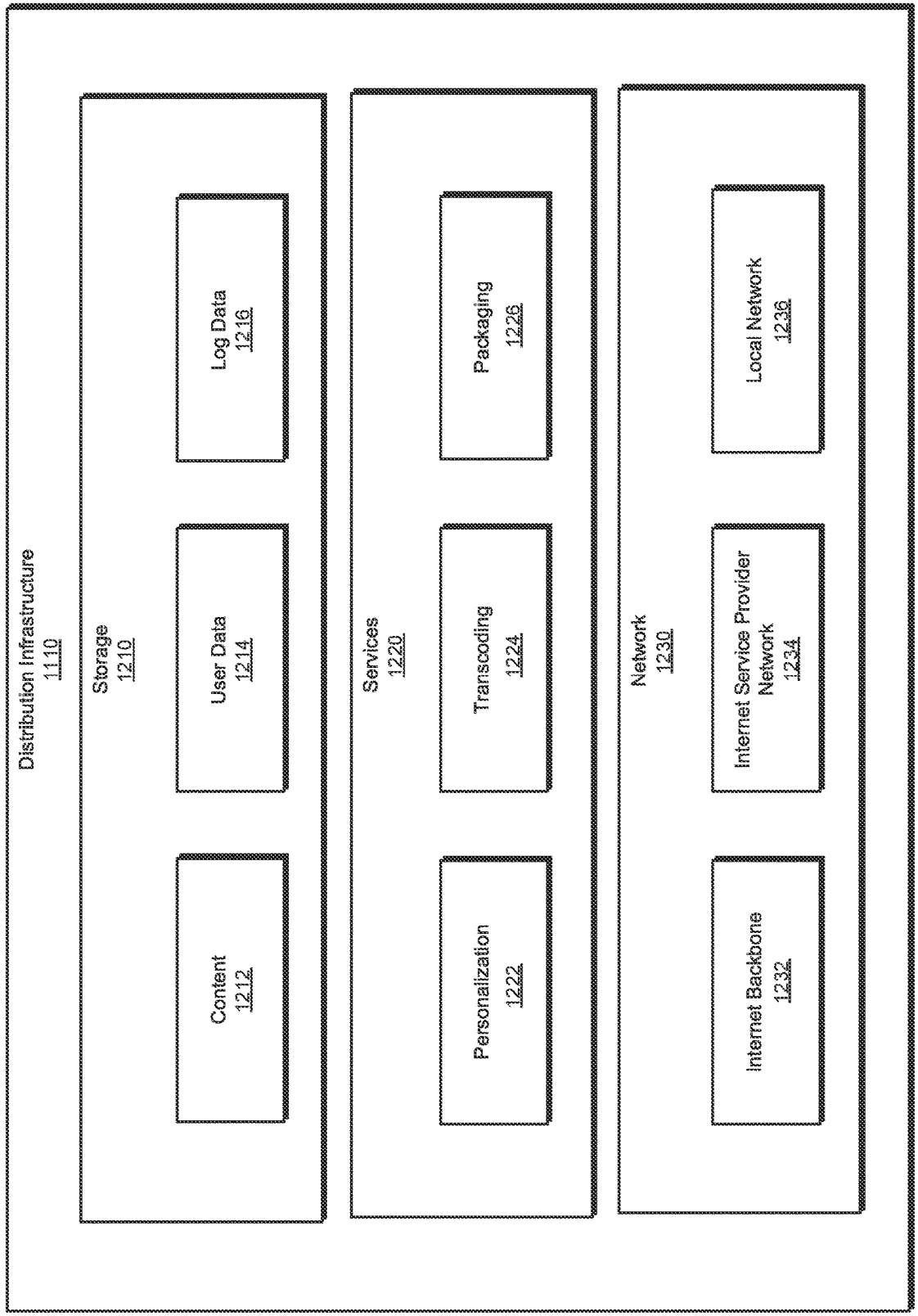
FIG. 12 is a block diagram of an exemplary distribution infrastructure within the content distribution ecosystem shown in FIG. 11.
Figure 13:
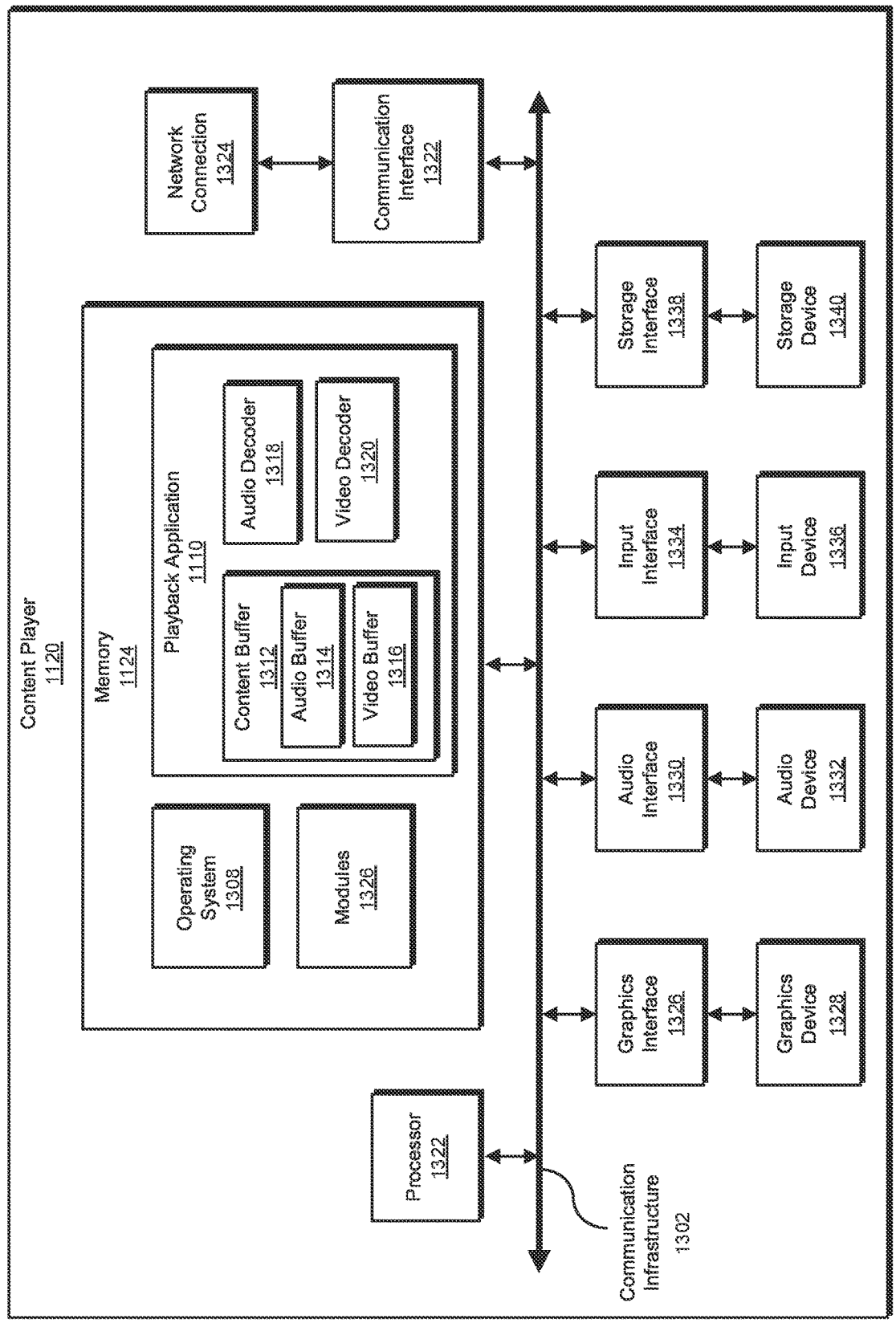
FIG. 13 is a block diagram of an exemplary content player within the content distribution ecosystem shown in FIG. 11.

The following will provide, with reference to FIG. 11, detailed descriptions of exemplary ecosystems in which content is provisioned to end nodes and in which requests for content are steered to specific end nodes. The discussion corresponding to FIGS. 12 and 13 presents an overview of an exemplary distribution infrastructure and an exemplary content player used during playback sessions, respectively.

FIG. 11 is a block diagram of a content distribution ecosystem 1100 that includes a distribution infrastructure 1110 in communication with a content player 1120. In some embodiments, distribution infrastructure 1110 is configured to encode data at a specific data rate and to transfer the encoded data to content player 1120. Content player 1120 is configured to receive the encoded data via distribution infrastructure 1110 and to decode the data for playback to a user. The data provided by distribution infrastructure 1110 includes, for example, audio, video, text, images, animations, interactive content, haptic data, virtual or augmented reality data, location data, gaming data, or any other type of data that is provided via streaming.

Distribution infrastructure 1110 generally represents any services, hardware, software, or other infrastructure components configured to deliver content to end users. For example, distribution infrastructure 1110 includes content aggregation systems, media transcoding and packaging services, network components, and/or a variety of other types of hardware and software. In some cases, distribution infrastructure 1110 is implemented as a highly complex distribution system, a single media server or device, or anything in between. In some examples, regardless of size or complexity, distribution infrastructure 1110 includes at least one physical processor 1112 and at least one memory device 1114. One or more modules 1116 are stored or loaded into memory 1114 to enable adaptive streaming, as discussed herein.

Content player 1120 generally represents any type or form of device or system capable of playing audio and/or video content that has been provided over distribution infrastructure 1110. Examples of content player 1120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 1110, content player 1120 includes a physical processor 1122, memory 1124, and one or more modules 1126. Some or all of the adaptive streaming processes described herein is performed or enabled by modules 1126, and in some examples, modules 1116 of distribution infrastructure 1110 coordinate with modules 1126 of content player 1120 to provide adaptive streaming of multimedia content.

In certain embodiments, one or more of modules 1116 and/or 1126 in FIG. 11 represent one or more software applications or programs that, when executed by a computing device, cause the computing device to perform one or more tasks. For example, and as will be described in greater detail below, one or more of modules 1116 and 1126 represent modules stored and configured to run on one or more general-purpose computing devices. One or more of modules 1116 and 1126 in FIG. 11 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 1112 and 1122 generally represent any type or form of hardware-implemented processing unit capable of interpreting and/or executing computer-readable instructions. In one example, physical processors 1112 and 1122 access and/or modify one or more of modules 1116 and 1126, respectively. Additionally or alternatively, physical processors 1112 and 1122 execute one or more of modules 1116 and 1126 to facilitate adaptive streaming of multimedia content. Examples of physical processors 1112 and 1122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 1114 and 1124 generally represent any type or form of volatile or non-volatile storage device or medium capable of storing data and/or computer-readable instructions. In one example, memory 1114 and/or 1124 stores, loads, and/or maintains one or more of modules 1116 and 1126. Examples of memory 1114 and/or 1124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 12 is a block diagram of exemplary components of content distribution infrastructure 1110 according to certain embodiments. Distribution infrastructure 1110 includes storage 1210, services 1220, and a network 1230. Storage 1210 generally represents any device, set of devices, and/or systems capable of storing content for delivery to end users. Storage 1210 includes a central repository with devices capable of storing terabytes or petabytes of data and/or includes distributed storage systems (e.g., appliances that mirror or cache content at Internet interconnect locations to provide faster access to the mirrored content within certain regions). Storage 1210 is also configured in any other suitable manner.

As shown, storage 1210 may store a variety of different items including content 1212, user data 1214, and/or log data 1216. Content 1212 includes television shows, movies, video games, user-generated content, and/or any other suitable type or form of content. User data 1214 includes personally identifiable information (PII), payment information, preference settings, language and accessibility settings, and/or any other information associated with a particular user or content player. Log data 1216 includes viewing history information, network throughput information, and/or any other metrics associated with a user's connection to or interactions with distribution infrastructure 1110.

Services 1220 includes personalization services 1222, transcoding services 1224, and/or packaging services 1226. Personalization services 1222 personalize recommendations, content streams, and/or other aspects of a user's experience with distribution infrastructure 1110. Encoding services 1224 compress media at different bitrates which, as described in greater detail below, enable real-time switching between different encodings. Packaging services 1226 package encoded video before deploying it to a delivery network, such as network 1230, for streaming.

Network 1230 generally represents any medium or architecture capable of facilitating communication or data transfer. Network 1230 facilitates communication or data transfer using wireless and/or wired connections. Examples of network 1230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 12, network 1230 includes an Internet backbone 1232, an internet service provider 1234, and/or a local network 1236. As discussed in greater detail below, bandwidth limitations and bottlenecks within one or more of these network segments triggers video and/or audio bit rate adjustments.

FIG. 13 is a block diagram of an exemplary implementation of content player 1120 of FIG. 11. Content player 1120 generally represents any type or form of computing device capable of reading computer-executable instructions. Content player 1120 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 13, in addition to processor 1122 and memory 1124, content player 1120 includes a communication infrastructure 1302 and a communication interface 1322 coupled to a network connection 1324. Content player 1120 also includes a graphics interface 1326 coupled to a graphics device 1328, an input interface 1334 coupled to an input device 1336, and a storage interface 1338 coupled to a storage device 1340.

Communication infrastructure 1302 generally represents any type or form of infrastructure capable of facilitating communication between one or more components of a computing device. Examples of communication infrastructure 1302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 1124 generally represents any type or form of volatile or non-volatile storage device or medium capable of storing data and/or other computer-readable instructions. In some examples, memory 1124 stores and/or loads an operating system 1308 for execution by processor 1122. In one example, operating system 1308 includes and/or represents software that manages computer hardware and software resources and/or provides common services to computer programs and/or applications on content player 1120.

Operating system 1308 performs various system management functions, such as managing hardware components (e.g., graphics interface 1326, audio interface 1330, input interface 1334, and/or storage interface 1338). Operating system 1308 also provides process and memory management models for playback application 1310. The modules of playback application 1310 includes, for example, a content buffer 1312, an audio decoder 1318, and a video decoder 1320.

Playback application 1310 is configured to retrieve digital content via communication interface 1322 and to play the digital content through graphics interface 1326. Graphics interface 1326 is configured to transmit a rendered video signal to graphics device 1328. In normal operation, playback application 1310 receives a request from a user to play a specific title or specific content. Playback application 1310 then identifies one or more encoded video and audio streams associated with the requested title. After playback application 1310 has located the encoded streams associated with the requested title, playback application 1310 downloads sequence header indices associated with each encoded stream associated with the requested title from distribution infrastructure 1110. A sequence header index associated with encoded content includes information related to the encoded sequence of data included in the encoded content.

In one embodiment, playback application 1310 begins downloading the content associated with the requested title by downloading sequence data encoded to the lowest audio and/or video playback bitrates to minimize startup time for playback. The requested digital content file is then downloaded into content buffer 1312, which is configured to serve as a first-in, first-out queue. In one embodiment, each unit of downloaded data includes a unit of video data or a unit of audio data. As units of video data associated with the requested digital content file are downloaded to the content player 1120, the units of video data are pushed into the content buffer 1312. Similarly, as units of audio data associated with the requested digital content file are downloaded to the content player 1120, the units of audio data are pushed into the content buffer 1312. In one embodiment, the units of video data are stored in video buffer 1316 within content buffer 1312 and the units of audio data are stored in audio buffer 1314 of content buffer 1312.

A video decoder 1310 reads units of video data from video buffer 1316 and outputs the units of video data in a sequence of video frames corresponding in duration to the fixed span of playback time. Reading a unit of video data from video buffer 1316 effectively de-queues the unit of video data from video buffer 1316. The sequence of video frames is then rendered by graphics interface 1326 and transmitted to graphics device 1328 to be displayed to a user.

An audio decoder 1318 reads units of audio data from audio buffer 1314 and outputs the units of audio data as a sequence of audio samples, generally synchronized in time with a sequence of decoded video frames. In one embodiment, the sequence of audio samples is transmitted to audio interface 1330, which converts the sequence of audio samples into an electrical audio signal. The electrical audio signal is then transmitted to a speaker of audio device 1332, which, in response, generates an acoustic output.

In situations where the bandwidth of distribution infrastructure 1110 is limited and/or variable, playback application 1310 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1326 is configured to generate frames of video data and transmit the frames of video data to graphics device 1328. In one embodiment, graphics interface 1326 is included as part of an integrated circuit, along with processor 1122. Alternatively, graphics interface 1326 is configured as a hardware accelerator that is distinct from (i.e., is not integrated within) a chipset that includes processor 1122.

Graphics interface 1326 generally represents any type or form of device configured to forward images for display on graphics device 1328. For example, graphics device 1328 is fabricated using liquid crystal display (LCD) technology, cathode-ray technology, and light-emitting diode (LED) display technology (either organic or inorganic). In some embodiments, graphics device 1328 also includes a virtual reality display and/or an augmented reality display. Graphics device 1328 includes any technically feasible means for generating an image for display. In other words, graphics device 1328 generally represents any type or form of device capable of visually displaying information forwarded by graphics interface 1326.

As illustrated in FIG. 13, content player 1120 also includes at least one input device 1336 coupled to communication infrastructure 1302 via input interface 1334. Input device 1336 generally represents any type or form of computing device capable of providing input, either computer or human generated, to content player 1120. Examples of input device 1336 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 1120 also includes a storage device 1340 coupled to communication infrastructure 1302 via a storage interface 1338. Storage device 1340 generally represents any type or form of storage device or medium capable of storing data and/or other computer-readable instructions. For example, storage device 1340 may be a magnetic disk drive, a solid-state drive, an optical disk drive, a flash drive, or the like. Storage interface 1338 generally represents any type or form of interface or device for transferring data between storage device 1340 and other components of content player 1120.

Many other devices or subsystems are included in or connected to content player 1120. Conversely, one or more of the components and devices illustrated in FIG. 13 need not be present to practice the embodiments described and/or illustrated herein. The devices and subsystems referenced above are also interconnected in different ways from that shown in FIG. 13. Content player 1120 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 1120. All or a portion of the computer program stored on the computer-readable medium is then stored in memory 1124 and/or storage device 1340. When executed by processor 1122, a computer program loaded into memory 1124 causes processor 1122 to perform and/or be a means for performing the functions of one or more of the example embodiments described and/or illustrated herein. Additionally or alternatively, one or more of the example embodiments described and/or illustrated herein are implemented in firmware and/or hardware. For example, content player 1120 is configured as an Application Specific Integrated Circuit (ASIC) adapted to implement one or more of the example embodiments disclosed herein Example Embodiments 1. A computer-implemented method comprising: accessing one or more media segments that correspond to at least one respective media item, wherein at least one of the media segments is divided into one or more discrete video shots; matching the discrete video shots in the media segments to corresponding video shots in the corresponding media items according to one or more matching factors; generating a relative similarity score between the matched video shots in the media segments and the corresponding video shots in the media items; and training a machine learning model to automatically identify video shots in the media items according to the generated relative similarity score between matched video shots.

2. The computer-implemented method of claim 1, wherein training the machine learning model to automatically identify video shots in media items comprises providing higher relative similarity scores as positive training data for the machine learning model, and providing lower relative similarity scores as negative training data for the machine learning model.

3. The computer-implemented method of claim 1, wherein training the machine learning model to automatically identify video shots in media items comprises providing matched video shots as positive training data for the machine learning model, and providing unmatched video shots as negative training data for the machine learning model.

4. The computer-implemented method of claim 1, wherein the one or more matching factors comprise at least one of: a number of similar objects that appear across video shots; an amount of similar coloring across video shots; an amount of similar motion between video shots; an identification of similar film characters across video shots; or an identification of similar backgrounds across video shots.

5. The computer-implemented method of claim 1, further comprising providing, for each video shot in at least one of the media items, a recommendation score indicating how desirable each video shot is to have in a corresponding media item trailer.

6. The computer-implemented method of claim 1, wherein the machine learning model is specific to an identified genre.

7. The computer-implemented method of claim 6, wherein the media segments and the respective media items comprise media segments and media items of the identified genre.

8. The computer-implemented method of claim 6, wherein the genre is identified by recognizing one or more patterns in the media item and categorizing the media item as belonging to the identified genre.

9. The computer-implemented method of claim 1, further comprising: accessing at least one different media item for which no corresponding media trailer has been generated; segmenting the at least one different media item into a plurality of video shots; and applying the trained machine learning model to the at least one different media item to generate a recommendation score for each video shot, the recommendation score indicating how desirable each video shot is to have in a corresponding media item trailer.

10. The computer-implemented method of claim 9, further comprising ranking the discrete video shots of the at least one different media item according to each shots' respective recommendation score.

11. The computer-implemented method of claim 10, further comprising automatically assembling the discrete video shots into a new media item trailer based on the ranking.

12. The computer-implemented method of claim 10, further comprising providing the ranked, discrete video shots to a media item trailer producer for arrangement into a media item trailer.

13. A system comprising: at least one physical processor; and physical memory comprising computer-executable instructions that, when executed by the physical processor, cause the physical processor to: access one or more media segments that correspond to at least one respective media item, wherein at least one of the media segments is divided into one or more discrete video shots; match the discrete video shots in the media segments to corresponding video shots in the corresponding media items according to one or more matching factors; generate a relative similarity score between the matched video shots in the media segments and the corresponding video shots in the media items; and train a machine learning model to automatically identify video shots in the media items according to the generated relative similarity score between matched video shots.

14. The system of claim 13, wherein the video shots automatically identified by the machine learning model comprise a hook clip for at least one of the media items, the hook clip comprising one or more video shots designed to generate interest in the corresponding media item.

15. The system of claim 13, wherein the video shots automatically identified by the machine learning model comprise one or more scenes of interest in at least one of the media items.

16. The system of claim 15, wherein the video shots automatically identified by the machine learning model comprise one or more media item video frames from which at least one film artwork image is derived.

17. The system of claim 13, wherein the computer-executable instructions further cause the physical processor to filter and remove one or more of the identified video shots that are identified for use in at least one media trailer.

18. The system of claim 17, wherein one or more of the filtered video shots that were removed from being used in at least one of the media trailers includes a spoiler moment.

19. The system of claim 17, wherein one or more of the filtered video shots that were removed from being used in at least one of the media trailers includes sensitive content.

20. A non-transitory computer-readable medium comprising one or more computer-executable instructions that, when executed by at least one processor of a computing device, cause the computing device to: access one or more media segments that correspond to at least one respective media item, wherein at least one of the media segments is divided into one or more discrete video shots; match the discrete video shots in the media segments to corresponding video shots in the corresponding media items according to one or more matching factors; generate a relative similarity score between the matched video shots in the media segments and the corresponding video shots in the media items; and train a machine learning model to automatically identify video shots in the media items according to the generated relative similarity score between matched video shots.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to score media content shots, use the result of the transformation to rank media shots based on the score, and store the result of the transformation to train a machine learning model. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   accessing at least one media item;
   segmenting the accessed media item into a plurality of video shots;
   instantiating a trained machine learning model that has been trained to automatically identify video shots in media items according to a relative similarity score that indicates a similarity between matched and unmatched video shots; and
   applying the trained machine learning model to the accessed media item to generate a recommendation score for the plurality of video shots, the recommendation score indicating a degree to which each video shot is recommended for inclusion in a media item trailer that corresponds to the media item, wherein generating the recommendation score includes maximizing a comparative contrast between matched video shots and unmatched video shots.

2. The computer-implemented method of claim 1, wherein training of the trained machine learning model includes maximizing a comparative contrast between matched video shots and unmatched video shots.

3. The computer-implemented method of claim 1, further comprising ranking the video shots of the at least one media item according to each video shots' generated recommendation score.

4. The computer-implemented method of claim 3, further comprising automatically assembling the plurality of video shots into a new media item trailer according to the recommendation score ranking.

5. The computer-implemented method of claim 3, further comprising providing the ranked, video shots to a media item trailer producer for arrangement into a media item trailer.

6. The computer-implemented method of claim 1, wherein training of the trained machine learning model is performed by:
   matching one or more of the video shots in the media item to corresponding video shots in another media item according to one or more matching factors, wherein at least one of the video shots remains unmatched;
   generating a relative similarity score between the matched video shots in the at least one media item and the corresponding video shots in the other media item;
   generating a second relative similarity score for unmatched video shots in the at least one media item.

7. The computer-implemented method of claim 6, wherein the one or more matching factors comprise at least one of:
   a number of similar objects that appear across video shots;
   an amount of similar coloring across video shots;
   an amount of similar motion between video shots;
   an identification of similar film characters across video shots; or
   an identification of similar backgrounds across video shots.

8. The computer-implemented method of claim 1, wherein training the machine learning model to automatically identify video shots in media items comprises providing higher relative similarity scores as positive training data for the machine learning model and providing lower relative similarity scores as negative training data for the machine learning model.

9. The computer-implemented method of claim 1, wherein training the machine learning model to automatically identify video shots in media items comprises providing matched video shots as positive training data for the machine learning model and providing unmatched video shots as negative training data for the machine learning model.

10. The computer-implemented method of claim 1, wherein the machine learning model is specific to an identified genre.

11. The computer-implemented method of claim 10, wherein the at least one media item comprises video shots of the identified genre.

12. The computer-implemented method of claim 10, wherein the genre is identified by recognizing one or more patterns in the at least one media item and categorizing the media item as belonging to the identified genre.

13. A system comprising:
   at least one physical processor; and
   physical memory comprising computer-executable instructions that, when executed by the physical processor, cause the physical processor to:
   access at least one media item;
   segment the accessed media item into a plurality of video shots;
   instantiate a trained machine learning model that has been trained to automatically identify video shots in media items according to a relative similarity score that indicates a similarity between matched and unmatched video shots; and
   apply the trained machine learning model to the media item to generate a recommendation score for the plurality of video shots, the recommendation score indicating a degree to which each video shot is recommended for inclusion in a media item trailer that corresponds to the media item, wherein generating the recommendation score includes maximizing a comparative contrast between matched video shots and unmatched video shots.

14. The system of claim 13, wherein the video shots automatically identified by the machine learning model comprise a hook clip for at least one of the media items, the hook clip comprising one or more video shots designed to generate interest in the accessed media item.

15. The system of claim 13, wherein the video shots automatically identified by the trained machine learning model comprise one or more scenes of interest in the at least one media item.

16. The system of claim 15, wherein the video shots automatically identified by the trained machine learning model comprise one or more media item video frames from which at least one film artwork image is derived.

17. The system of claim 13, wherein the computer-executable instructions further cause the physical processor to filter and remove one or more of the identified video shots that are identified for use in at least one media trailer.

18. The system of claim 17, wherein one or more of the filtered video shots that were removed from being used in at least one of the media trailers includes a spoiler moment.

19. The system of claim 17, wherein one or more of the filtered video shots that were removed from being used in at least one of the media trailers includes sensitive content.

20. A non-transitory computer-readable medium comprising one or more computer-executable instructions that, when executed by at least one processor of a computing device, cause the computing device to:
- access at least one media item;
- segment the accessed media item into a plurality of video shots;
- instantiate a trained machine learning model that has been trained to automatically identify video shots in media items according to a relative similarity score that indicates a similarity between matched and unmatched video shots; and
- apply the trained machine learning model to the media item to generate a recommendation score for the plurality of video shots, the recommendation score indicating a degree to which each video shot is recommended for inclusion in a media item trailer that corresponds to the media item, wherein generating the recommendation score includes maximizing a comparative contrast between matched video shots and unmatched video shots.

* * * * *